(12) United States Patent
Kato et al.

(10) Patent No.: US 8,325,263 B2
(45) Date of Patent: Dec. 4, 2012

(54) CAMERA AND WEARABLE IMAGE DISPLAY APPARATUS

(75) Inventors: Shigeru Kato, Tachikawa (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 145 days.

(21) Appl. No.: 12/707,069

(22) Filed: Feb. 17, 2010

(65) Prior Publication Data
US 2010/0208121 A1    Aug. 19, 2010

(30) Foreign Application Priority Data

Feb. 19, 2009  (JP) .................................. 2009-036755
Mar. 18, 2009  (JP) .................................. 2009-066714

(51) Int. Cl.
H04N 5/222    (2006.01)
H04N 5/228    (2006.01)
G09G 5/00     (2006.01)

(52) U.S. Cl. ...................... 348/333.07; 348/208.1; 345/8
(58) Field of Classification Search ........................ None
See application file for complete search history.

(56) References Cited

U.S. PATENT DOCUMENTS

| | | | | |
|---|---|---|---|---|
| 6,556,240 | B2 * | 4/2003 | Oka et al. | 348/211.99 |
| 6,893,132 | B2 * | 5/2005 | Mori et al. | 353/63 |
| 7,460,155 | B2 * | 12/2008 | Eto et al. | 348/208.99 |
| 2004/0189850 | A1 * | 9/2004 | Chang | 348/333.07 |
| 2005/0046811 | A1 | 3/2005 | Mori et al. | |
| 2005/0264654 | A1 | 12/2005 | Eto et al. | |
| 2005/0270409 | A1 * | 12/2005 | Takeuchi | 348/345 |

FOREIGN PATENT DOCUMENTS

| | | |
|---|---|---|
| CN | 1199302 | 11/1998 |
| JP | 2001-209037 | 8/2001 |
| JP | 2004-304270 | 10/2004 |

OTHER PUBLICATIONS

Notification of the Second Office Action for Chinese Patent Application No. 201010117398.9, mailed Jul. 11, 2012 (6 pgs.) with translation (8 pgs.).

* cited by examiner

*Primary Examiner* — Luong T Nguyen
(74) *Attorney, Agent, or Firm* — John C. Pokotylo; Straub & Pokotylo

(57) ABSTRACT

A camera operates in cooperation with a wearable image display apparatus configured to be wearable on an eye region of a user. The camera includes an imaging unit, a vibration detection unit, a transmission availability judgment unit and a communication unit. The imaging unit acquires an image of a subject. The vibration detection unit detects vibration of the camera. The transmission availability judgment unit permits transmission of the image acquired by the imaging unit to the wearable image display apparatus when the vibration detection unit does not detect the vibration of the camera, and prohibits transmission of the image acquired by the imaging unit to the wearable image display apparatus when the vibration detection unit detects the vibration of the camera. The communication unit transmits the image acquired by the imaging unit to the wearable image display apparatus when transmission of the image acquired by the imaging unit is permitted.

17 Claims, 19 Drawing Sheets

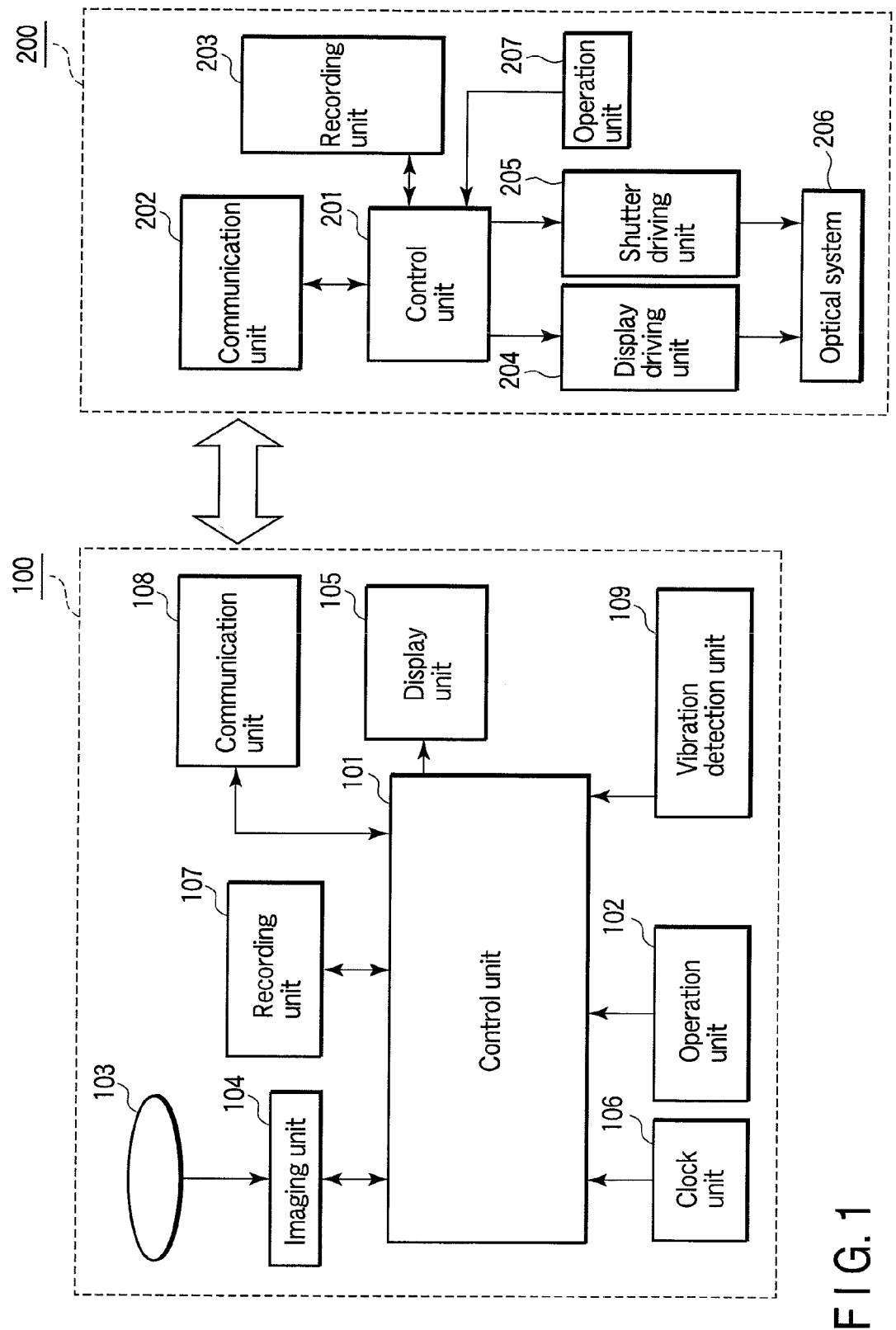
F I G. 1

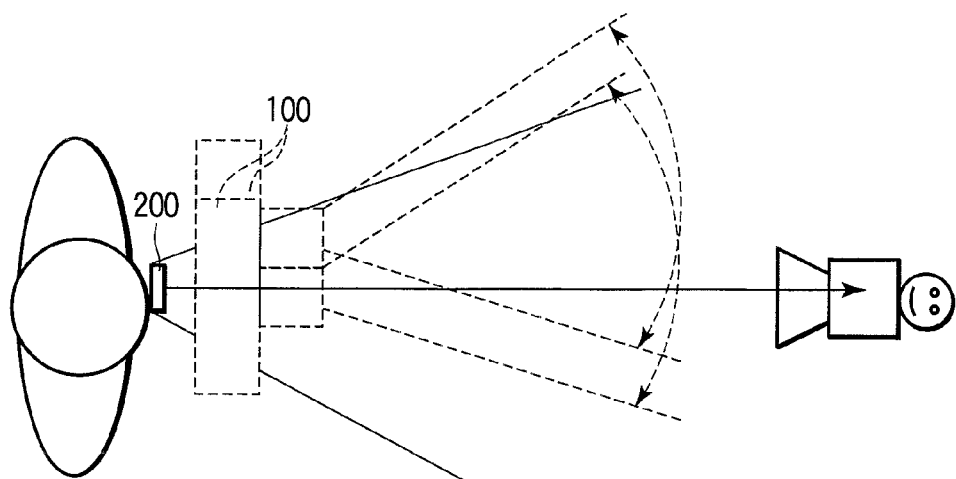
F I G. 6 A
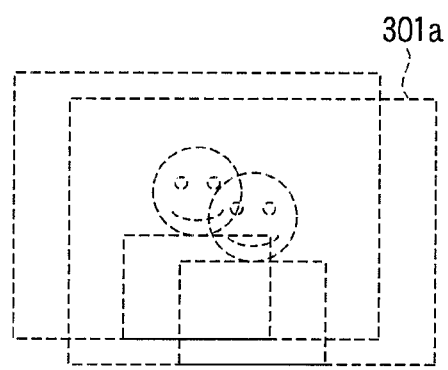
F I G. 6 B
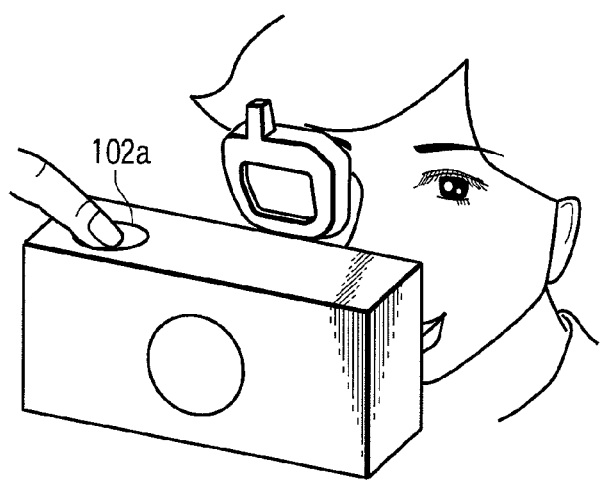
F I G. 6 C

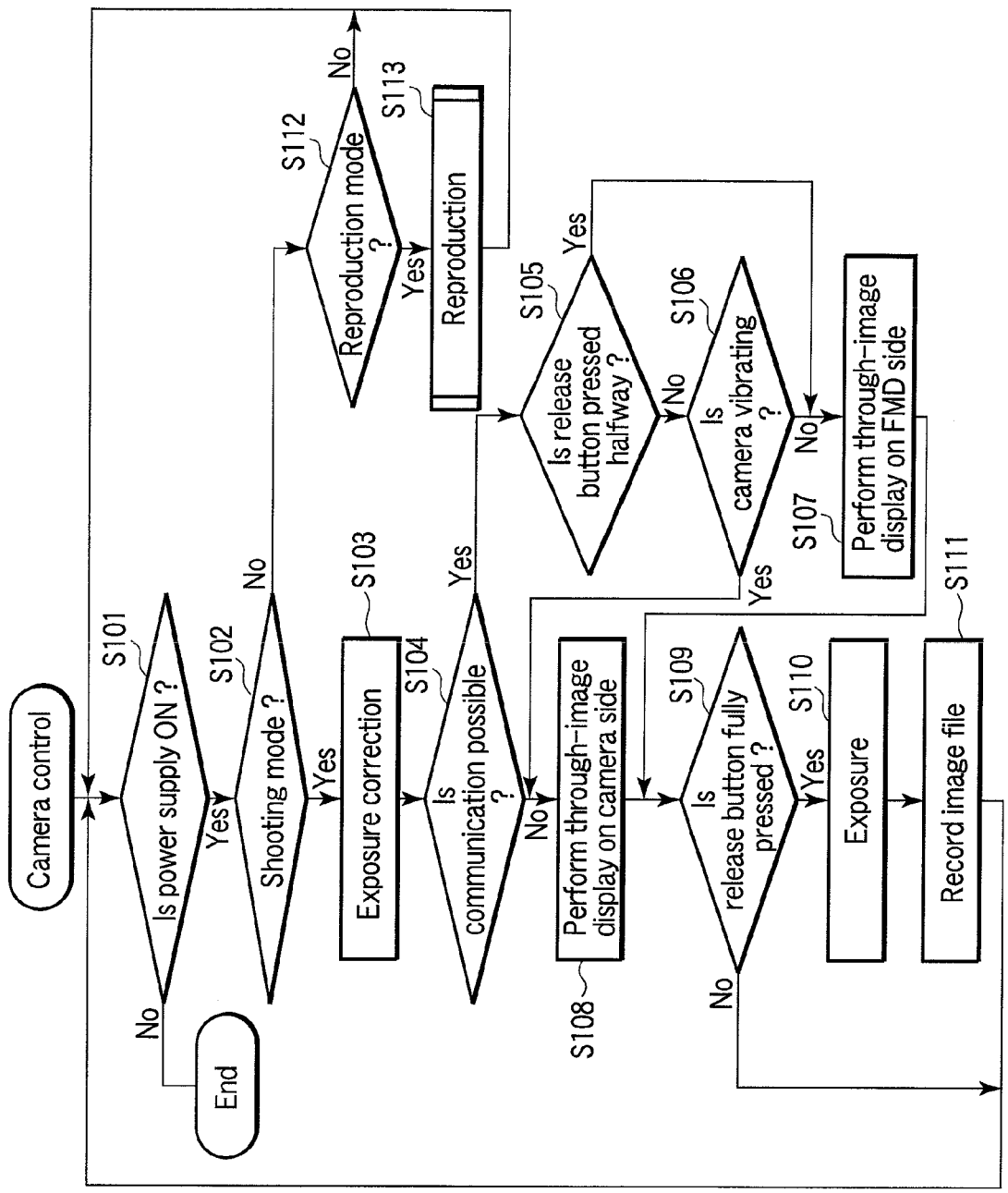
F I G. 8

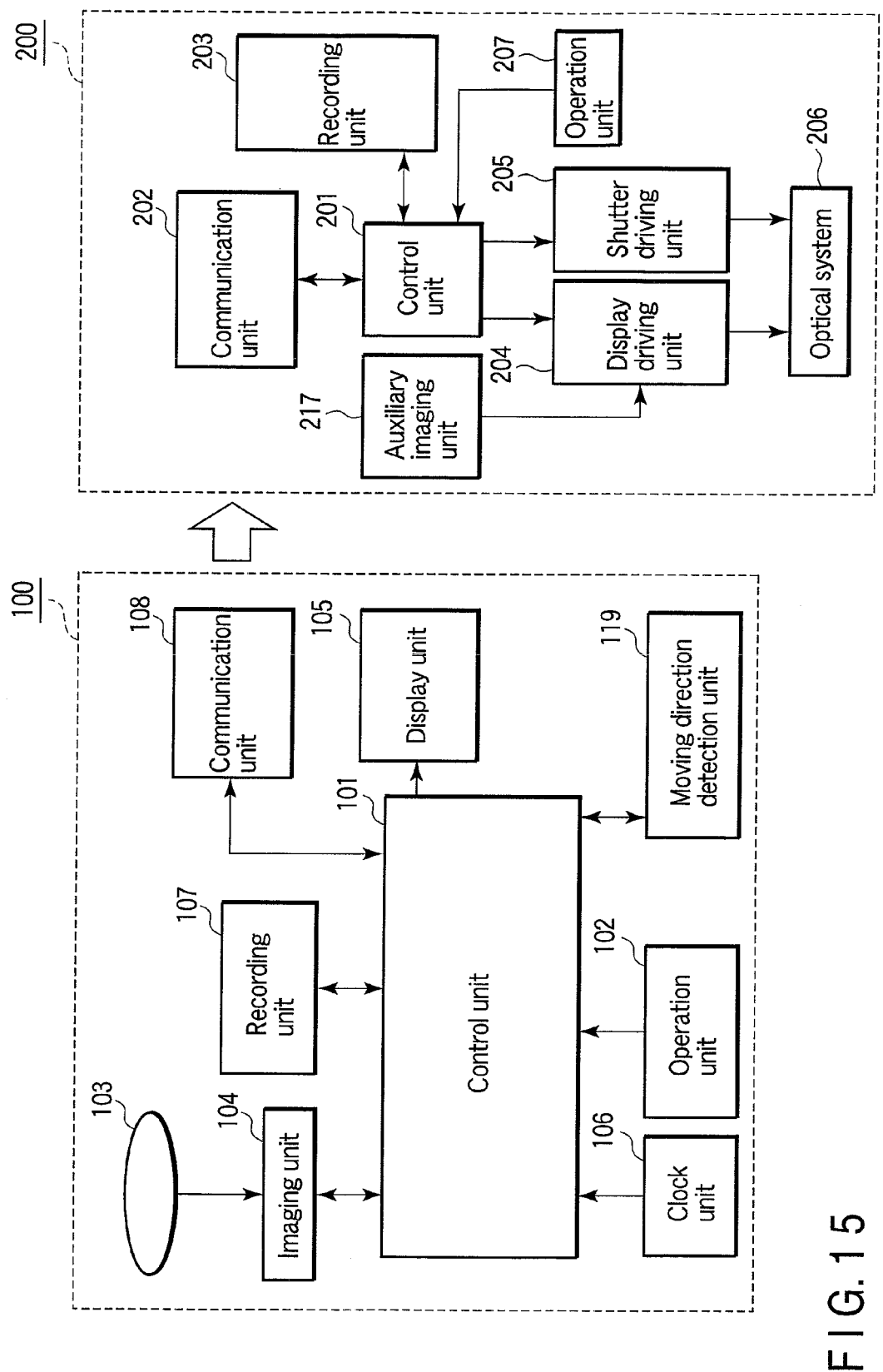
F I G. 15

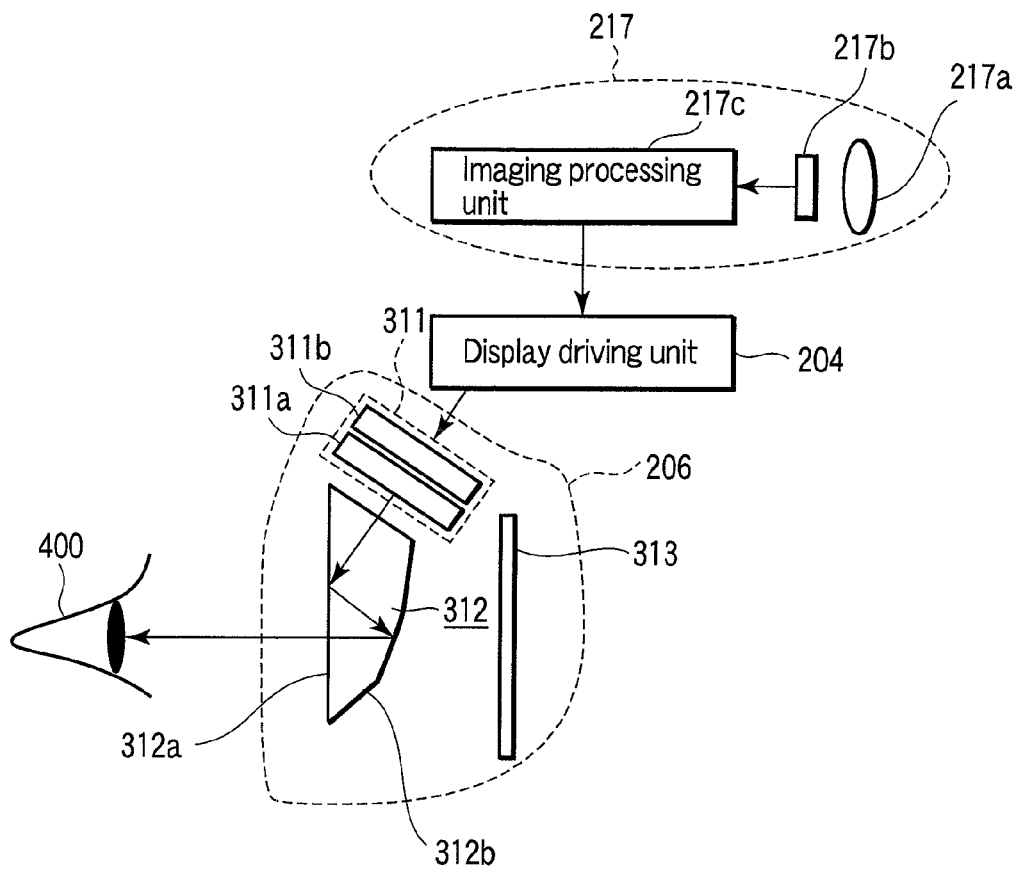
F I G. 16
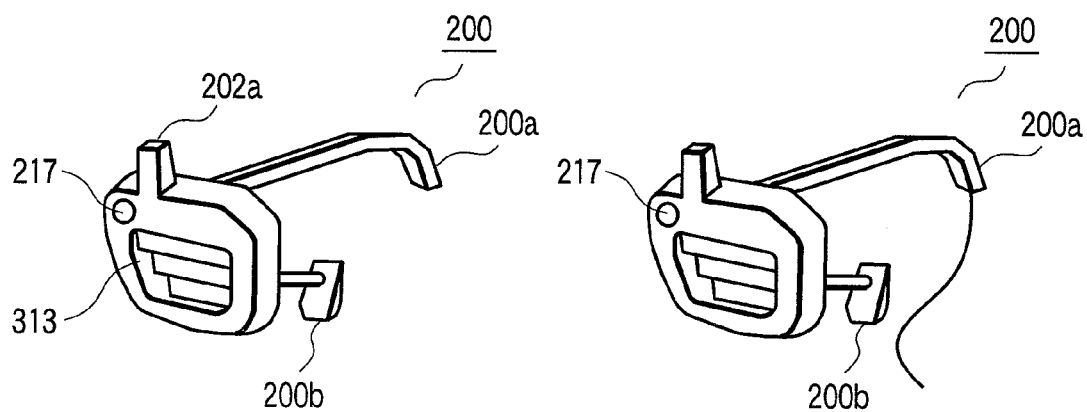
F I G. 17A  F I G. 17B

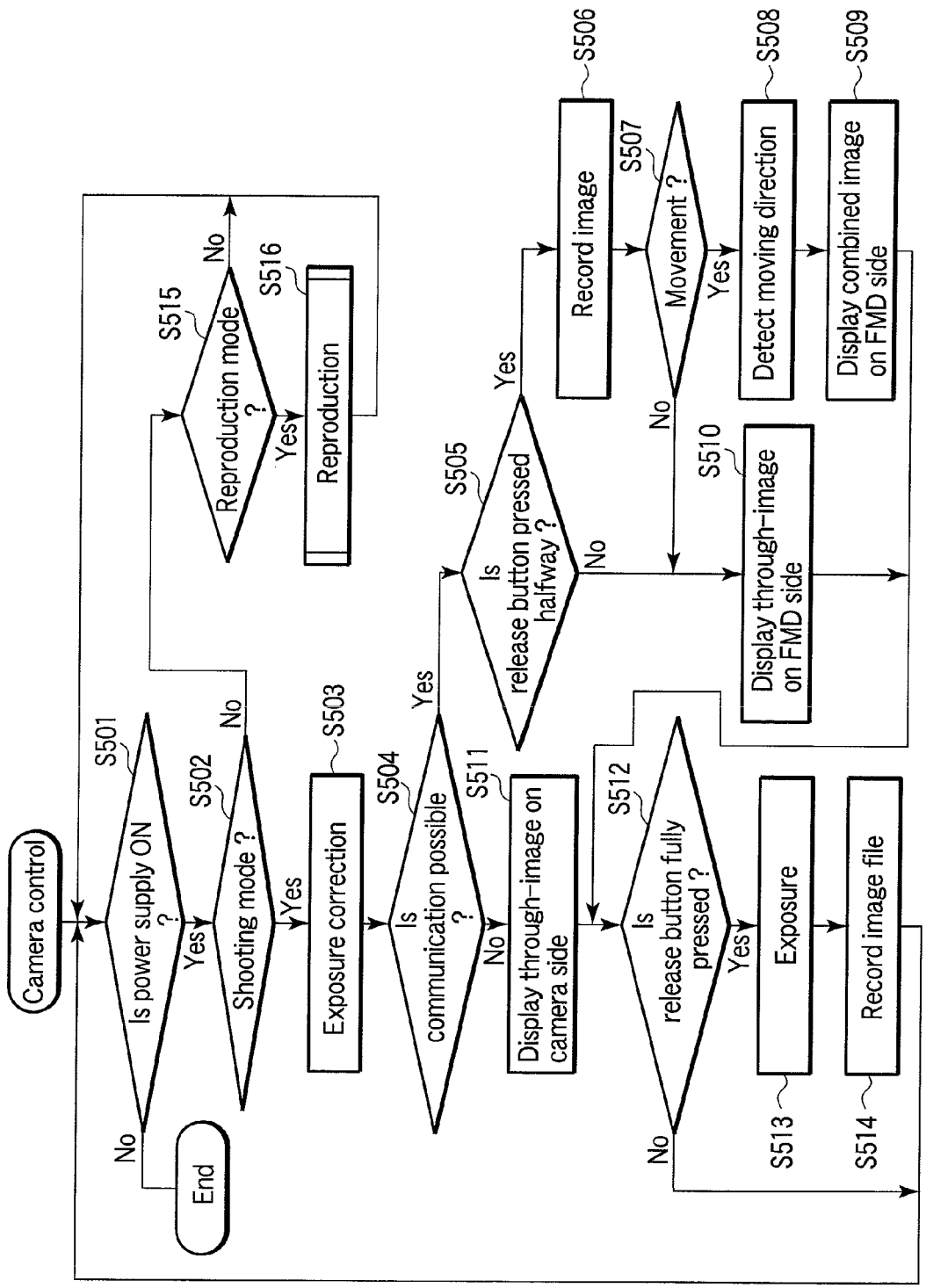
F I G. 19

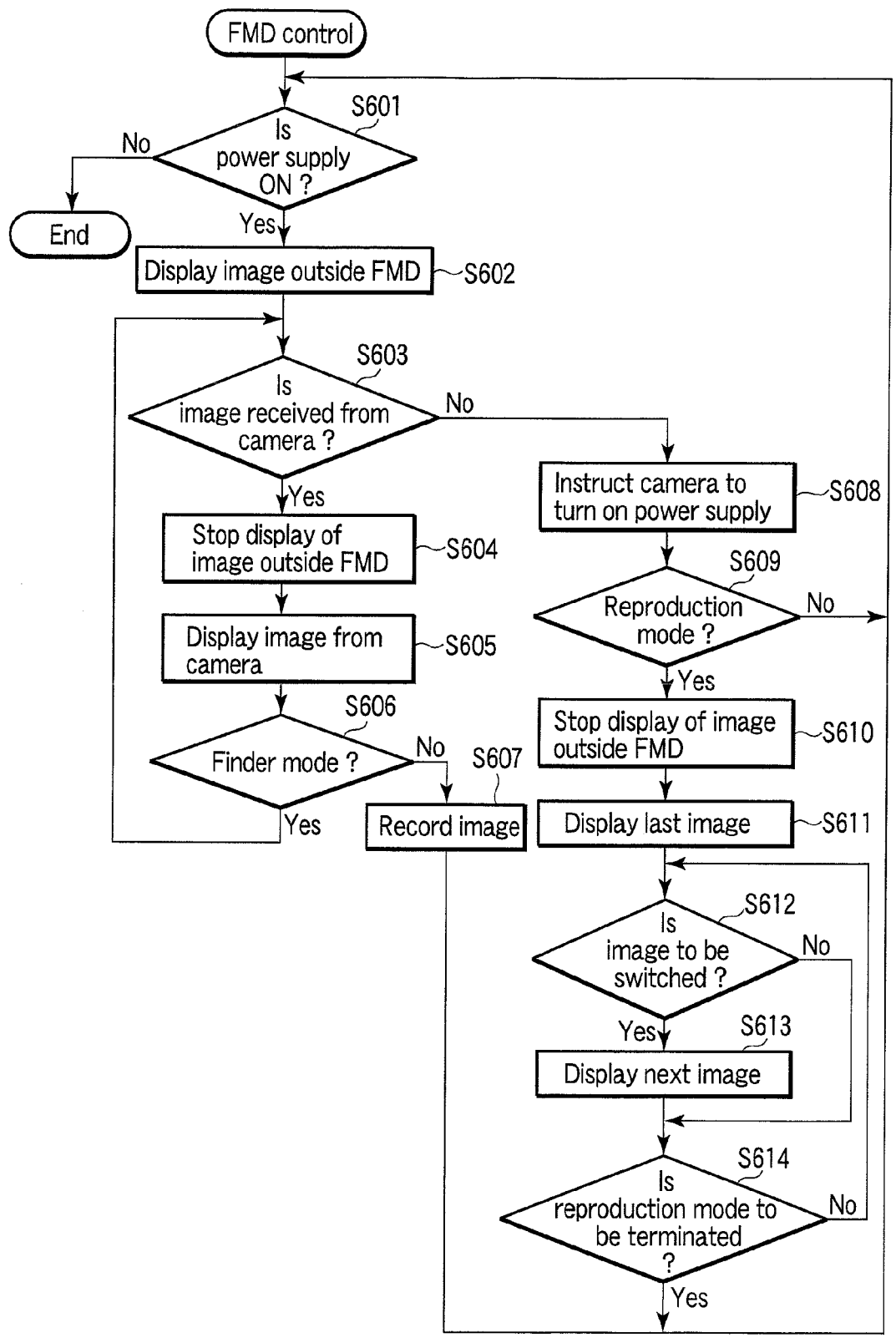
F I G. 2 0

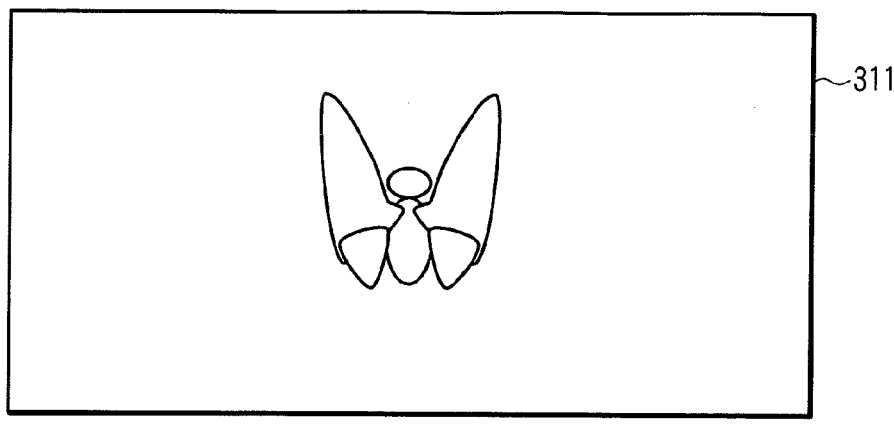
F I G. 2 1 A
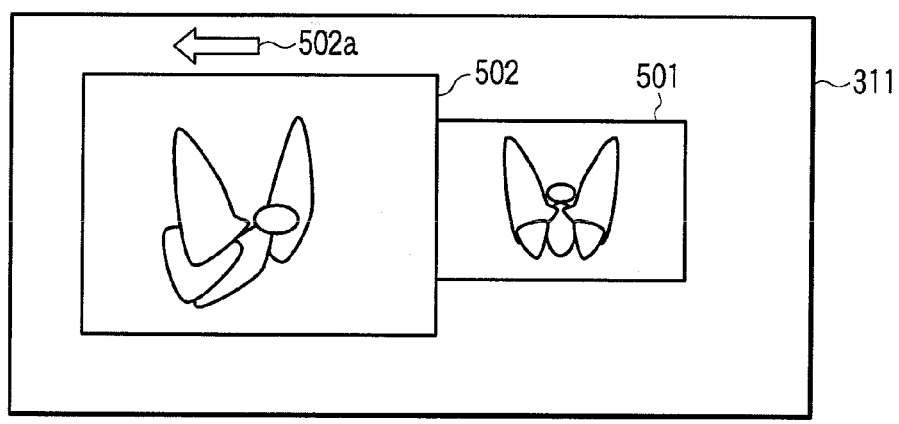
F I G. 2 1 B
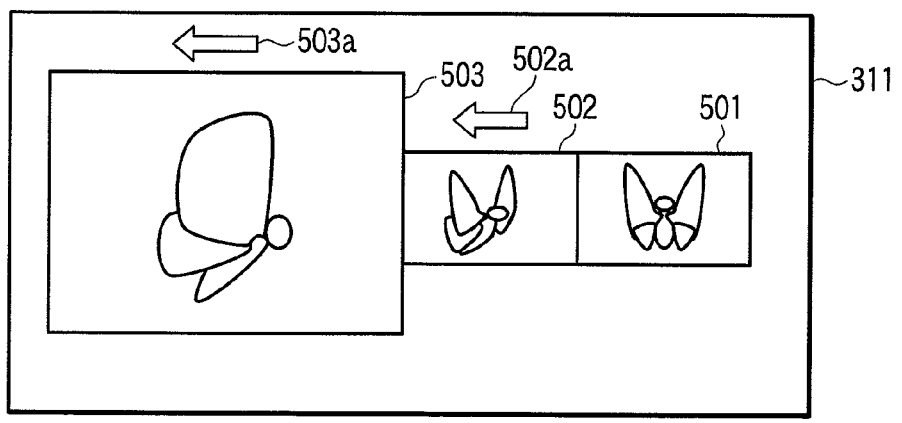
F I G. 2 1 C

CAMERA AND WEARABLE IMAGE DISPLAY APPARATUS

CROSS-REFERENCE TO RELATED APPLICATIONS

This application is based upon and claims the benefit of priority from prior Japanese Patent Applications No. 2009-036755, filed Feb. 19, 2009; and No. 2009-066714, filed Mar. 18, 2009, the entire contents of both of which are incorporated herein by reference.

BACKGROUND OF THE INVENTION

1. Field of the Invention

The present invention relates to a camera which operates in cooperation with a wearable image display apparatus that is wearable on an eye of a user and to a wearable image display apparatus which operates in cooperation with such a camera.

2. Description of the Related Art

In recent years, a flow of miniaturization and high performance of devices is accelerated, and such high-performance devices can be carried to outdoor areas and others. In such a tendency, a wearable image display apparatus that enables viewing images as if watching a large-sized screen even in outdoor areas has been suggested under the name FMD (face mount display) or HMD (head mount display). Further, for example, JP-A 2001-209037 (KOKAI) suggests utilizing such a wearable image display apparatus as a finder apparatus for a camera.

Shooting using such a wearable image display apparatus has the following merits.

(1) Images can be confirmed as if watching a large-sized screen.

(2) Images having bright colors can be confirmed without being affected by outside light.

(3) A degree of freedom in directions or movements of a camera at the time of shooting increases.

BRIEF SUMMARY OF THE INVENTION

According to a first aspect of the invention, there is provided a camera which operates in cooperation with a wearable image display apparatus configured to be wearable on an eye region of a user, comprising: an imaging unit which acquires an image by imaging a subject; a vibration detection unit which detects vibration of the camera; a transmission availability judgment unit which permits transmission of the image acquired by the imaging unit to the wearable image display apparatus when the vibration detection unit does not detect the vibration of the camera, and which prohibits transmission of the image acquired by the imaging unit to the wearable image display apparatus when the vibration detection unit detects the vibration of the camera; and a communication unit which transmits the image acquired by the imaging unit to the wearable image display apparatus when transmission of the image acquired by the imaging unit is permitted.

According to a second aspect of the invention, there is provided a camera which operates in cooperation with a wearable image display apparatus configured to be wearable on an eye region of a user, comprising: an imaging unit which acquires an image by imaging a subject; a vibration detection unit which detects vibration of the camera; and a communication unit which permits transmission of the image acquired by the imaging unit to the wearable image display apparatus when the vibration detection unit does not detect the vibration of the camera, and transmits the image acquired by the imaging unit to the wearable image display apparatus in such a manner that an image transmission rate becomes lower than that in the event that the vibration detection unit does not detect the vibration of the camera when the vibration detection unit detects the vibration of the camera.

According to a third aspect of the invention, there is provided a camera which operates in cooperation with a wearable image display apparatus configured to be wearable on an eye region of a user, comprising: an imaging unit which acquires a plurality of images by continuously imaging a subject; a moving direction detection unit which detects a moving direction of the camera at the time of acquiring each of the plurality of images; an image combination unit which generates a combined image obtained by combining the plurality of images acquired by the imaging unit with images indicative of the moving directions of the camera; and a communication unit which transmits the combined image obtained by the image combination unit to the wearable image display apparatus.

According to a fourth aspect of the invention, there is provided a wearable image display apparatus which is configured to be wearable on an eye region of a user and operates in cooperation with a camera, comprising: a reception unit which receives a plurality of images from the camera; a moving direction detection unit which detects moving directions of the camera; an image combination unit which generates a combined image obtained by combining the plurality of images received by the reception unit with of images indicative of the moving directions of the camera detected by the moving direction detection unit; and a display unit which displays the combined image obtained by the image combination unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a configuration of a camera system having a camera according to a first embodiment of the present invention;

FIG. 6A is a view showing a state when the camera vibrates;

FIG. 6B is a view showing an image displayed in the FMD when the camera vibrates;

FIG. 6C is a view showing a situation where an image should be displayed in the FMD even though the vibration is produced;

FIG. 8 is a flowchart showing a main operation of the camera according to the first embodiment of the present invention;

FIG. 15 is a block diagram showing a configuration of a camera system having a camera according to a second embodiment of the present invention;

FIG. 16 is a view showing an example of configurations of an optical system and an auxiliary imaging unit of an FMD according to the second embodiment;

FIGS. 17A and 17B are appearance diagrams of the FMD according to the second embodiment;

FIG. 19 is a flowchart showing a main operation of the camera according to the second embodiment of the present invention;

FIG. 20 is a flowchart showing a main operation of the FMD according to the second embodiment of the present invention;

FIGS. 21A, 21B and 21C are views each showing an example of combination display;

DETAILED DESCRIPTION OF THE INVENTION

Figure 2A:
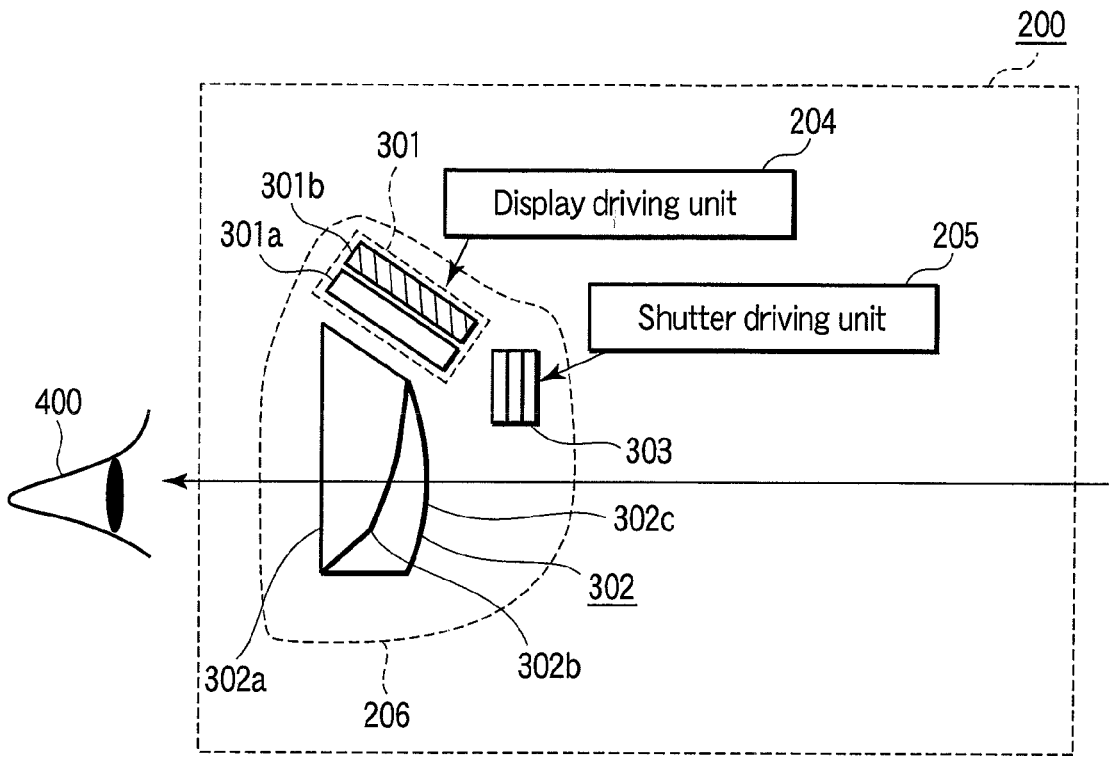
FIGS. 2A and 2B are views each showing an example of a configuration of an optical system.

Embodiments according to the present invention will now be described with reference to the accompanying drawings.

First Embodiment

FIG. 1 is a block diagram showing a configuration of a camera system having a camera according to a first embodiment of the present invention. As shown in FIG. 1, the camera system according to this embodiment has a camera 100 and a face mount display (FMD) 200. The camera 100 is connected with the FMD 200 to allow mutual communication. When an image acquired by the camera 100 is transmitted to the FMD 200, the image acquired by the camera 100 can be viewed in the FMD 200.

The camera 100 has a control unit 101, an operation unit 102, a shooting lens 103, an imaging unit 104, a display unit 105, a clock unit 106, a recording unit 107, a communication unit 108 and a vibration detection unit 109.

The control unit 101 is formed of, e.g., an LSI configured for a camera, and it controls each block in the camera 100 depicted in FIG. 1 in response to an operation from the operation unit 102 by a user. Furthermore, the control unit 101 carries out image processing such as white balance correction or compression/expansion processing and others with respect to an image acquired by the imaging unit 104.

The operation unit 102 is an operation unit that is utilized by a user to operate the camera 100. The operation unit 102 includes, e.g., a power supply button that turns on and off a power supply of the camera 100, a release button that instructs preparation or execution of shooting, a reproduction button that is utilized by a user to instruct reproduction of an image, a selection button that is utilized by the user to perform various selecting operations concerning the camera 100, and others. Preparation for shooting including AF and the like is instructed when the release button is pressed halfway, and execution of shooting is instructed when it is fully pressed.

The shooting lens 103 is a lens that causes a light flux from a non-illustrated subject to enter the imaging unit 104. The imaging unit 104 converts an image of the subject based on the light flux from the shooting lens 103 into an electrical signal to acquire an image. Furthermore, the imaging unit 104 outputs an image as digital data to the control unit 101.

The display unit 105 is provided on, e.g., a back surface of the camera 100. This display unit 105 displays various kinds of images such as an image acquired through the imaging unit 104 or an image recorded in the recording unit 107. The display unit 105 is formed of, e.g., a liquid crystal display. A user can confirm a composition of the subject or a photo opportunity through the display unit 105.

The clock unit 106 measures, e.g., a date and hour that an image is shot. The recording unit 107 records an image that is acquired through the imaging unit 104 and compressed by the control unit 101. This recording unit 107 records an image as an image file having shooting conditions such as a shooting date and hour measured by the clock unit 106 added thereto.

The communication unit 108 is a communication circuit that enables communication with the FMD 200. This communication unit 108 transmits an image to the FMD 200 under control of the control unit 101. A communication scheme of the camera 100 and the FMD 200 is not restricted in particular. For example, wire communication that the camera 100 is connected with the FMD 200 via, e.g., a USB cable to perform communication may be utilized, or wireless communication such as a wireless LAN may be utilized.

The vibration detection unit 109 detects the vibration of the camera 100. When the vibration detection unit 109 detects no occurrence of the vibration, the control unit 101 allows the communication unit 108 to transmit an image to the FMD 200. When the vibration detection unit 109 detects occurrence of the vibration, the control unit 101 prohibits the communication unit 108 from transmitting an image to the FMD 200.

The FMD 200 in this embodiment has a function as a wearable image display apparatus and it is wearable on an eye region of a user. This FMD 200 has a control unit 201, a communication unit 202, a recording unit 203, a display driving unit 204, a shutter driving unit 205, an optical system 206 and an operation unit 207.

The control unit 201 controls each block in the FMD 200. This control includes control over operations of the communication unit 202, expansion processing for images recorded in the recording unit 203, control over operations of the display driving unit 204 and the shutter driving unit 205, and others.

The communication unit 202 is a communication circuit that enables communication with the camera 100, and it receives images from the camera 100 under control of the control unit 101. The recording unit 203 records images received by the communication unit 202.

The display driving unit 204 drives a display unit included in the optical system 206 under control of the control unit 201. The shutter driving unit 205 drives a shutter included in the optical system 206 under control of the control unit 201. The optical system 206 is an optical system including a display unit that displays images received by the communication unit 202 or images recorded in the recording unit 203. This optical system 206 will be described later.

The operation unit 207 is a unit that carries out various operations such as ON/OFF switching of a power supply of the FMD 200 or operation mode switching of the FMD 200.

Figure 2B:
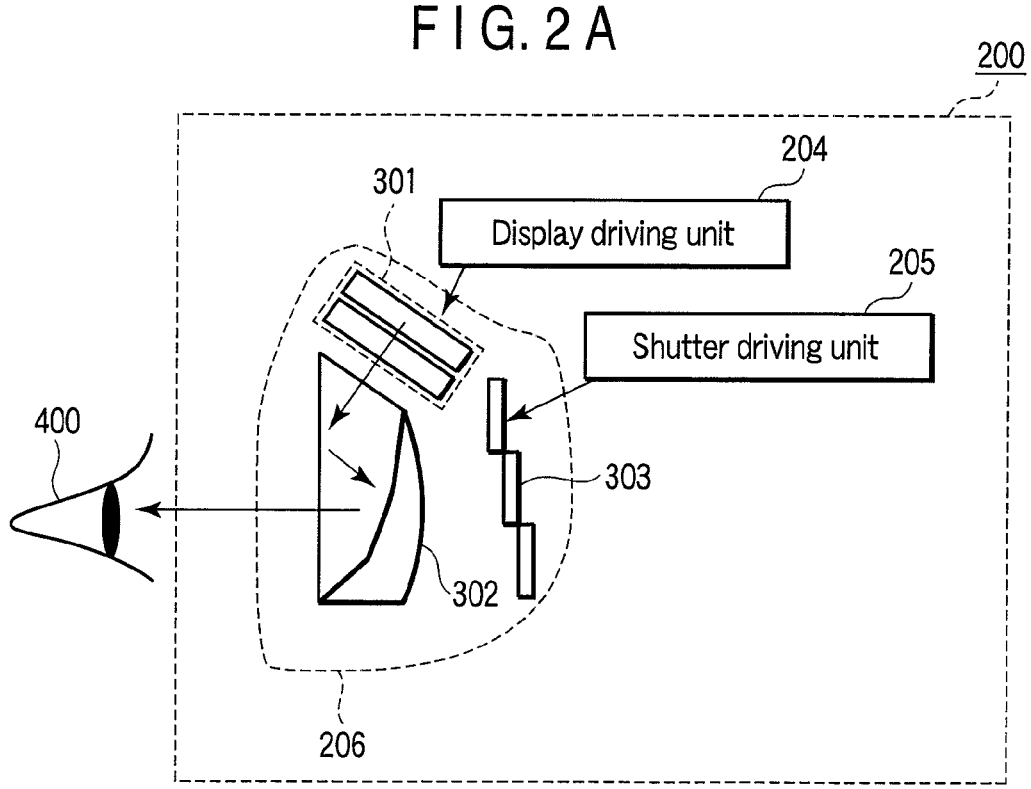

Each of FIGS. 2A and 2B is a view showing an example of a configuration of the optical system 206. As shown in FIGS. 2A and 2B, the optical system 206 has a display unit 301, an optical unit 302 and a shutter 303.

The display unit 301 is a display unit that displays images received by the communication unit 202 or images recorded in the recording unit 203. Each of FIGS. 2A and 2B shows an example that the display unit 301 is a liquid crystal display (LCD). The display unit 301 in this example has an LCD panel 301a and a backlight 301b. The LCD panel 301a is configured by two-dimensionally aligning pixels including liquid crystals, and it can change a light transmission factor of each pixel under control of the display driving unit 204. The backlight 301b has, e.g., a white light emitting diode (LED) as a light source, and it emits light from a back surface of the LCD panel 301a under control of the display driving unit 204. Although the LCD is used for the display unit 301 in the example depicted in FIGS. 2A and 2B, the display unit 301 is not restricted to the LCD. For example, an organic EL display (OELD) may be used for the display unit 301.

The optical unit 302 has a free-form surface prism 302a including a curved surface that forms an angle of 45 degrees with respect to an incidence direction (an arrow direction in the drawing) of light from the outside of the FMD 200. A free-form surface portion formed on this free-form surface prism 302a is coated with a half mirror 302b, and a correction prism 302c that corrects a power of the free-form surface prism 302a is bonded to the half mirror 302b.

The shutter 303 is arranged on an incident light path of light from the outside of the FMD 200. When an image is not displayed in the display unit 301 (when the backlight 301b is not turned on), the shutter 303 is in an opened state as shown in FIG. 2A. In this case, the light from the outside of the FMD 200 strikes on an eye 400 of a user through the optical unit 302. Therefore, the user can obtain a natural view without blocking a viewing field by attachment of the FMD 200.

On the other hand, when the display unit 301 displays an image (when the backlight 301b is lighted), the shutter is in a light shielding state as shown in FIG. 2B. In this case, the light from the outside of the FMD 200 is blocked by the shutter 303, and light based on the image displayed in the display unit 301 strikes on the eye 400 of the user through such a light path as indicated by arrows in FIG. 2B. As a result, the user can see the image displayed in the display unit 301.

Figure 3A:
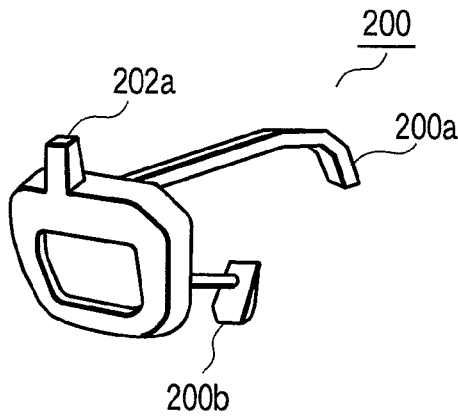
FIGS. 3A, 3B and 3C are appearance diagrams of FMDs.
Figure 3B:
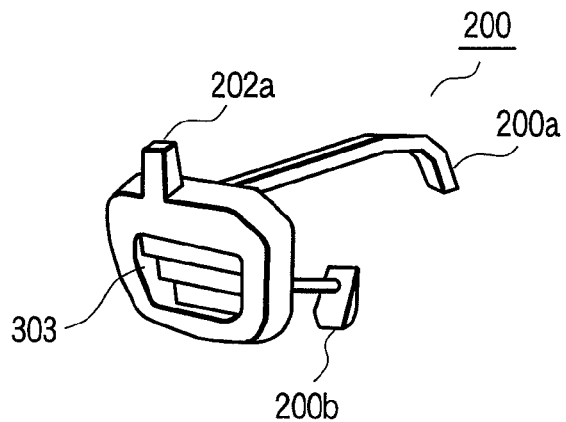
Figure 3C:
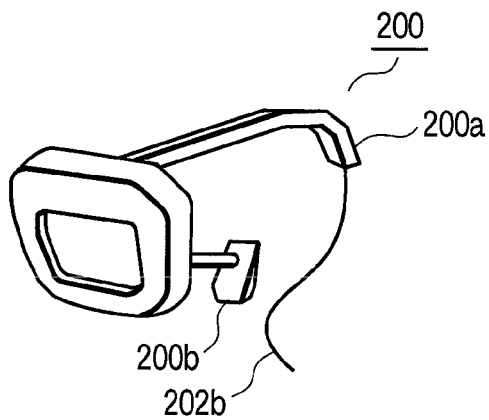

FIGS. 3A to 3C are appearance diagrams of the FMD 200. The FMD 200 in this embodiment has such a monocle-like appearance as depicted in FIG. 3A. The user puts an arc portion 200a formed in the FMD 200 like glasses on an ear and presses a nose pad portion 200b against a nose to wear the FMD 200. As described above, when an image transmitted from the camera 100 is displayed in the FMD 200, the shutter 303 is closed as depicted in FIG. 3B. Although FIG. 3A shows the FMD 200 which can be put with respect to one eye alone, the FMD 200 may be configured to be wearable on both eyes. In this case, the pair of optical systems 206 depicted in FIGS. 2A and 2B must be provided.

Moreover, FIGS. 3A and 3B show an example that a communication conformation of the FMD 200 is wireless communication. In this case, an antenna 202a of the communication unit 202 is provided to the FMD 200. On the other hand, when the communication conformation of the FMD 200 is wire communication, a cable 202b is connected with the FMD 200 as shown in FIG. 3C.

Figure 4A:
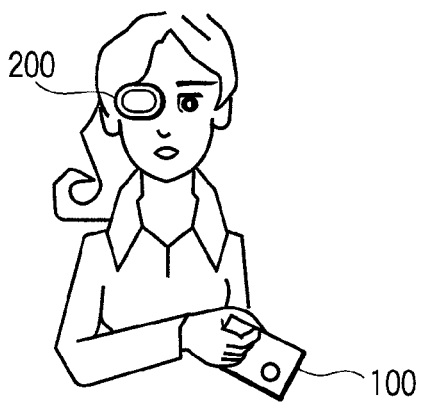
FIGS. 4A and 4B are views each showing a state when the camera system according to the first embodiment is used.
Figure 4B:
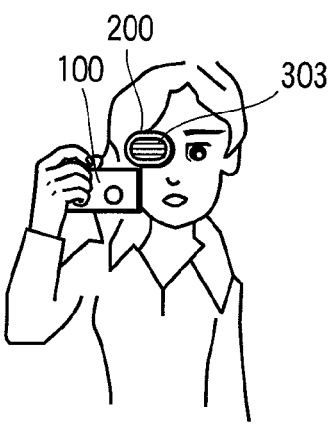

FIGS. 4A and 4B are views showing a state when the camera system in this embodiment is used. In the camera system according to this embodiment, when the FMD 200 is utilized as a finder, the user wears the FMD 200 over his/her eye region as depicted in FIG. 4A or 4B. When an image is not transmitted from the camera 100 to the FMD 200, the shutter 303 enters the opened state as shown in FIG. 4A so that the user can see the outside through a transparent glass. On the other hand, when an image is transmitted from the camera 100 to the FMD 200, the shutter 303 enters the light shielding state as shown in FIG. 4B so that the user can confirm the image transmitted from the camera 100 like watching a large screen. Images can be displayed near the eye of the user even though a display screen of the display unit 301 of the FMD 200 is small. Therefore, the user can acquire a sense as if an image of several-ten inches can be seen 2 m ahead.

Figure 5A:
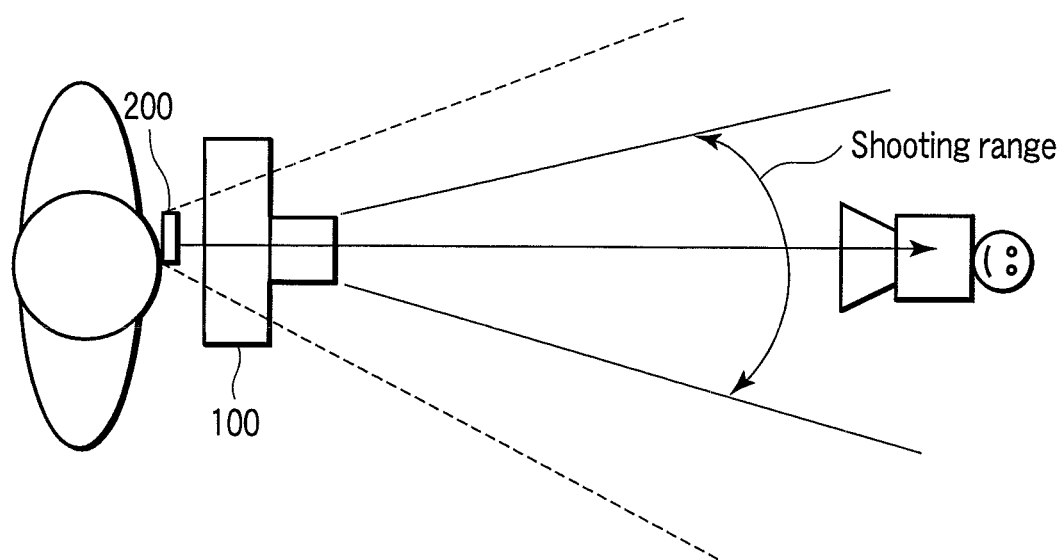
FIG. 5A is a view showing a state when a user appropriately holds a camera.
Figure 5B:
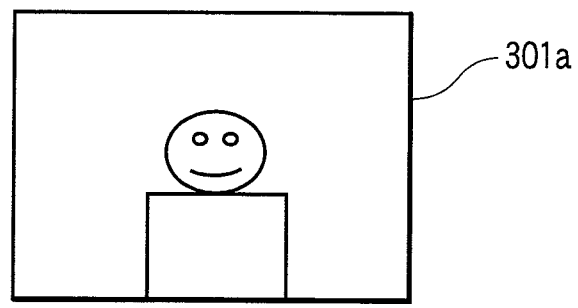
FIG. 5B is a view showing an image which should be displayed in the FMD when the user appropriately holds the camera.

Here, in a state that the camera 100 is appropriately held as shown in FIG. 5A, a direction that the user is to see coincides with a shooting range. In this case, the user has an intention or consciousness to take a picture. Therefore, in this case, it is desirable to effect display matched with a shooting result of the camera 100 in the display unit 301 of the FMD 200 as shown in FIG. 5B. On the other hand, when the camera 100 is not stably held as depicted in FIG. 6A, an image displayed in the display unit 301 of the FMD 200 also blurs as shown in FIG. 6B. Therefore, in such a case, it is desirable to prevent an image from being displayed in the display unit 301 of the FMD 200. However, in a situation that the release button 102a of the camera 100 is pressed halfway shown in FIG. 6C, since the user is to perform shooting, it is desirable to display an image in the display unit 301 of the FMD 200 irrespective of presence/absence of the vibration of the camera 100.

Figure 7A:
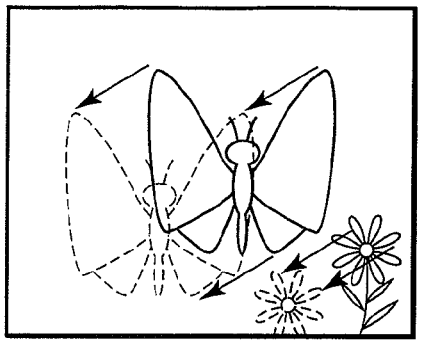
FIGS. 7A, 7B and 7C are views each showing an example of a vibration detection technique of a vibration detection unit.
Figure 7B:
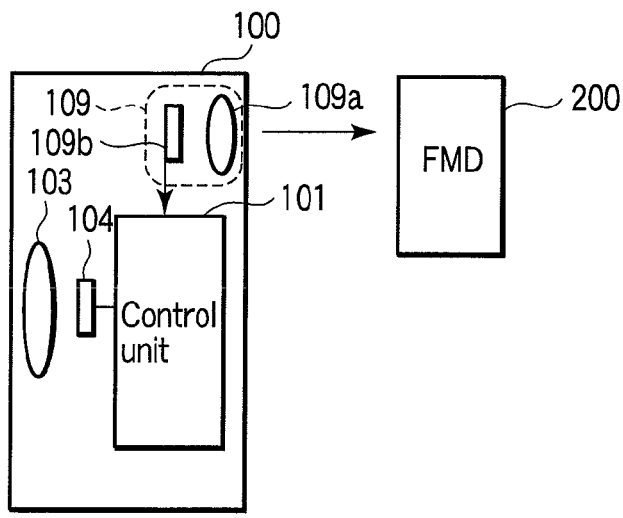
Figure 7C:
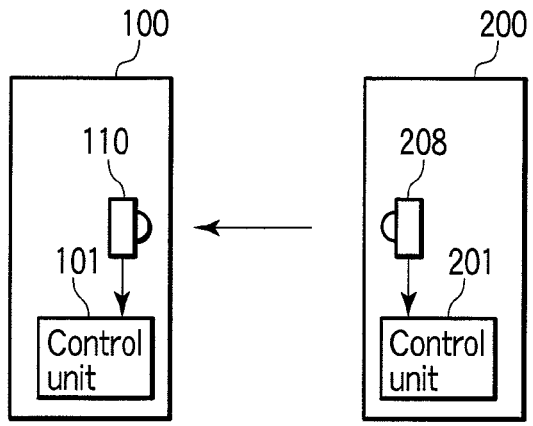

Each of FIGS. 7A to 7C is a view showing an example of a vibration detection technique of the vibration detection unit 109 that detects the vibration of the camera 100. The vibration detection unit 109 detects the vibration of the camera 100 based on motion vector calculated from an image obtained through the imaging unit 104, for example. It can be considered that, if an image acquired by the imaging unit 104 does not change with time, the camera 100 is not shaking. The motion vector can be acquired by calculating a shift (a shift direction and a shift amount) of a subject image between images obtained by continuously operating the imaging unit 104 based on, e.g., a block matching method. When the motion vectors are substantially the same in an entire image as shown in FIG. 7A, it can be determined that a subject is not moving but the entire image is moving, namely, the camera 100 is moving. In a situation that the movement of the camera 100 frequently changes (changes in the motion vectors in the entire image are larger than a threshold value), since the image displayed in the FMD 200 blurs as shown in FIG. 6B, it is determined that the camera 100 is vibrating.

The vibration of the camera 100 may be detected by using a vibration sensor such as an angular velocity sensor.

Additionally, as shown in FIG. 7B, the vibration detection unit 109 having a back surface lens 109a and a back surface imaging unit 109b may be provided to the camera 100. In this case, the vibration of the camera 100 may be detected by detecting motion vector in an image acquired by the back surface imaging unit 109b through the back surface lens 109a. Further, the vibration of the camera 100 may be detected from a state of supplying/receiving an optical signal between the camera 100 and the FMD 200. In this case, for example, as shown in FIG. 7C, a photo diode 110 is provided to the camera 100, and a light emitting diode 208 is provided to the FMD 200. In the configuration in FIG. 7C, light from the light emitting diode 208 is received by the photo diode 110 only when the light emitting diode 208 faces the photo diode 110. Therefore, it can be determined that the user holds the camera 100 and the camera 100 is not vibrating while signals are output from the photo diode 110.

A detailed operation of the camera system according to this embodiment will now be described.

An operation of the camera 100 will be first explained. FIG. 8 is a flowchart showing a main operation of the camera 100. Here, the camera 100 in this embodiment has a shooting mode and a reproduction mode as operation modes. The shooting mode is an operation mode in which the user shoots an image for recording. The reproduction mode is a mode in which a recorded image is reproduced. These operation modes can be switched by operating, e.g., a selection button in the operation unit 102.

In FIG. 8, the control unit 101 of the camera 100 first judges whether the power supply of the camera 100 has been turned on (step S101). When the power supply is determined to be OFF in the judgment at the step S101, the control unit 101 terminates processing depicted in FIG. 8. The communication unit 108 operates even though the power supply is OFF, and the control unit 101 turns on the power supply of the camera 100 when the FMD 200 supplies a power supply ON instruction through the communication unit 108. The camera 100 may supply a power supply ON instruction to the FMD 200.

On the other hand, when it is determined that the power supply has been turned on in the judgment at the step S101, the control unit 101 judges whether the operation mode of the camera 100 is the shooting mode (step S102). When the operation mode of the camera 100 is determined to be the shooting mode in the judgment at the step S102, the control unit 101 performs exposure correction (step S103). In this exposure correction, the control unit 101 measures brightness of the subject based on an image acquired through the imaging unit 104 or an output from a dedicated photometric sensor. Furthermore, based on the measured brightness of the subject, the control unit 101 corrects brightness of an image to provide appropriate brightness which is brightness of the image acquired through the imaging unit 104.

Then, the control unit 101 judges whether communication with the FMD 200 is possible from a communication state of the communication unit 108 (step S104). When the communication with the FMD 200 is determined to be possible as a result of the judgment at the step S104, the control unit 101 judges whether a photographer has pressed the release button of the operation unit 102 halfway (step S105). When it is determined that the release button has not been pressed halfway in the judgment at the step S105, the control unit 101 judges whether the camera 100 is vibrating based on an output from the vibration detection unit 109 (step S106).

When it is determined that the release button has been pressed halfway in the judgment at the step S105, or when it is determined that the camera 100 is not vibrating in the judgment at the step S106, the control unit 101 transmits an image acquired by the imaging unit 104 to the FMD 200 through the communication unit 108 to perform through-image display in the display unit 301 of the FMD 200 (step S107).

Moreover, when it is determined that communication with the FMD 200 is not possible in the judgment at the step S104, or when it is determined that the camera 100 is vibrating in the judgment at the step S106, the control unit 101 effects through-image display in the display unit 105 (step S108). The vibration of the camera 100 is also generated by panning or changing composition. In the case where, it is desirable that the FMD 200 keeps displaying an image of the camera 100. To separate the vibration generated by panning or changing composition and the vibration generated by the camera shake, the vibration judged in the step S108 is an irregular vibration which a user generates unintentionally. In the through-image display on the camera 100 side, the control unit 101 allows the imaging unit 104 to perform a continuous operation and displays images sequentially acquired through the imaging unit 104 based on this continuous operation in the display unit 105 in real time.

Based on the through-image display carried out at the step S107 or the step S108, the user can determine a composition or a photo opportunity. A power consumption of the camera 100 may be reduced to turn off display of the camera 100 at the time of the through-image display in the FMD 200. Additionally, in the example depicted in FIG. 8, when it is determined that the camera 100 is vibrating in the judgment at the step S106, the through-image display in the FMD 200 is avoided. On the other hand, processing for lowering a display rate of the through-image display in the FMD 200 may be executed. As this processing, for example, processing for reducing a transmission rate for an image from the communication unit 108 to the FMD 200 can be considered.

After the through-image display, the control unit 101 judges whether the photographer has fully pressed the release button in the operation unit 102 (step S109). When it is determined that the release button has not been fully pressed in the judgment at the step S109, the processing returns to the step S101. In this case, the control unit 101 again judges whether the power supply of the camera 100 is ON. On the other hand, when it is determined that the release button has been pressed in the judgment at the step S109, the control unit 101 executes exposure control (fetching an image for recording) (step S110). After fetching the image, the control unit 101 executes image processing such as compression processing with respect to the fetched image and then adds shooting conditions such as a shooting date and hour measured by the clock unit 106 to the processed image, thereby generating an image file. Furthermore, the control unit 101 records the generated image file in the recording unit 107 (step S111). Subsequently, the processing returns to the step S101.

Further, when it is determined that the operation mode of the camera 100 is not the shooting mode in the judgment at the step S102, the control unit 101 judges whether the operation mode of the camera 100 is the reproduction mode (step S112). When it is determined that the operation mode of the camera 100 is not the reproduction mode in the judgment at the step S112, the processing returns to the step S101. On the other hand, when the operation mode of the camera 100 is determined to be the reproduction mode in the judgment at the step S112, the control unit 101 executes processing in the reproduction mode (step S113). After the processing in the reproduction mode, the processing returns to the step S101.

Figure 9:
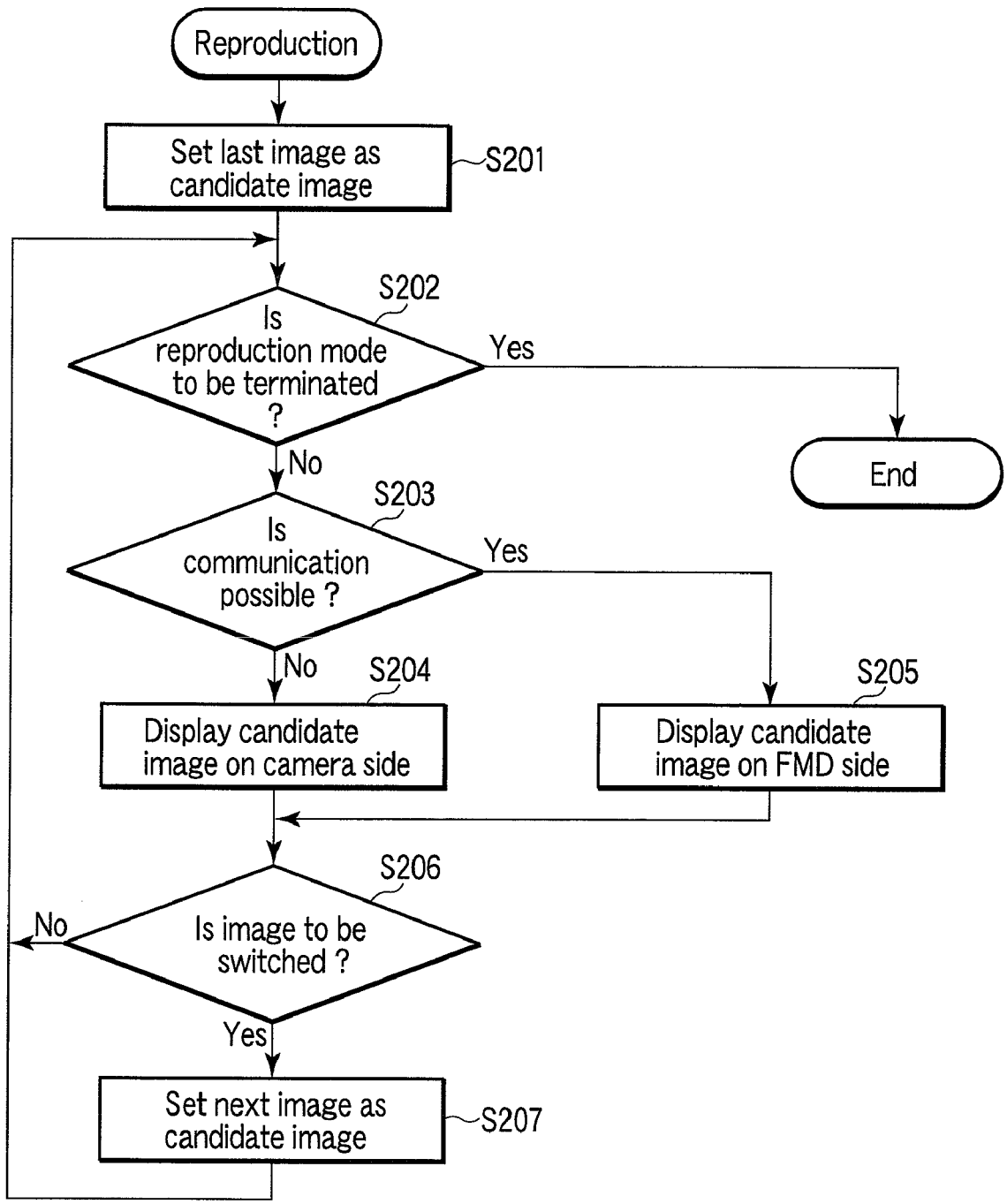
FIG. 9 is a flowchart showing processing in a reproduction mode in the camera according to the first embodiment of the present invention.

FIG. 9 is a flowchart showing processing in the reproduction mode. In FIG. 9, the control unit 101 sets the latest recorded image file in image files recorded in the recording unit 107 as a reproduction candidate image (step S201). Then, the control unit 101 judges whether the processing in the reproduction mode is to be terminated, i.e., whether the user has performed an operation for terminating the reproduction mode (step S202). The operation for terminating the reproduction mode is, e.g., an operation for switching the operation mode of the camera 100. When it is determined that the operation for terminating the reproduction mode has been performed in the judgment at the step S202, the control unit 101 terminates the processing in FIG. 9.

On the other hand, when it is determined that the operation for terminating the reproduction mode has not be performed in the judgment at the step S202, the control unit 101 judges whether communication with the FMD 200 is possible from a communication state of the communication unit 108 (step S203).

When the communication with the FMD 200 is determined to be impossible in the judgment at the step S203, the control unit 101 reads an image file corresponding to the candidate image from the recording unit 107 and executes expansion processing with respect to an image in the image file to be displayed in the display unit 105 (step S204). On the other hand, when the communication with the FMD 200 is determined to be possible in the judgment at the step S204, the control unit 101 reads the image file corresponding to the candidate image from the recording unit 107 to reproduce an image in the FMD 200. Additionally, the control unit 101 transmits the read image file to the FMD 200 via the communication unit 108 (step S205). At this time, the display unit 105 may not perform display. It is considered that such processing is executed since the user wears the FMD 200 and holds the camera 100 and he/she does not keep a sharp eye on the display unit 105.

After reproduction of an image, the control unit 101 judges whether the reproduction image is to be switched, i.e., whether the user has manipulated the operation unit 102 to perform an operation for switching the reproduction image (step S206). When it is determined that the reproduction image is not to be switched in the judgment at the step S206, the processing returns to the step S201. In this case, the control unit 101 again judges whether the processing in the reproduction mode is to be terminated. On the other hand, when it is determined that the reproduction image is to be switched in the judgment at the step S206, the control unit 101 sets an image file having the next latest shooting date and hour in the image files recorded in the recording unit 107 as the next candidate image (step S207). Then, the processing returns to the step S201.

Figure 10:
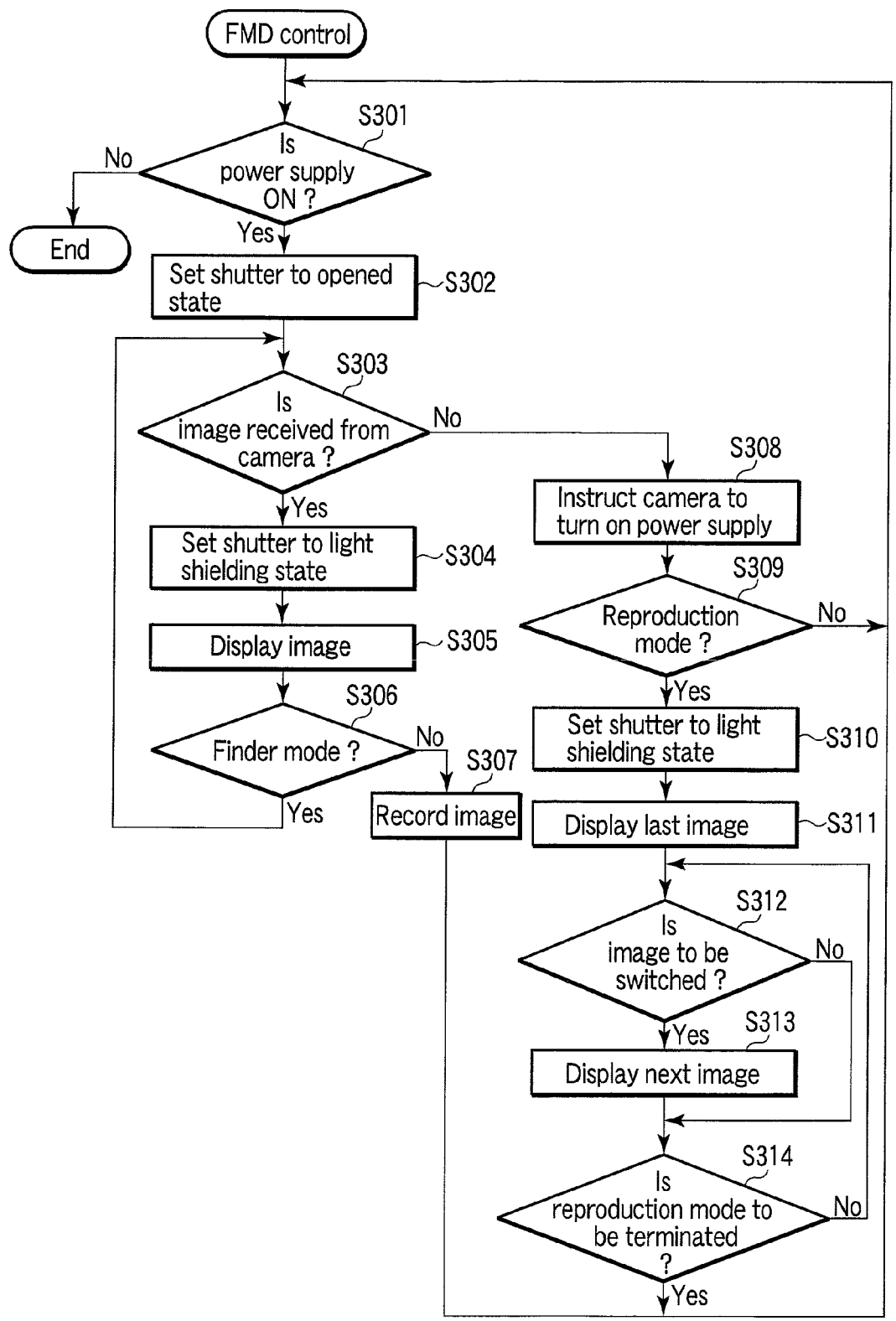
FIG. 10 is a flowchart showing a main operation of the FMD according to the first embodiment of the present invention.

FIG. 10 is a flowchart showing a main operation of the FMD 200. Here, the FMD 200 in this embodiment has a finder mode, a reproduction mode and a transparent glass mode as operation modes. The finder mode is an operation mode in which the FMD 200 is utilized as a finder of the camera 100. Furthermore, the reproduction mode is an operation mode in which images recorded in the recording unit 203 of the FMD 200 are reproduced. Moreover, the transparent glass mode is an operation mode in which the shutter 303 is in the opened state when no image is displayed in the display unit 301. The operation unit 207 in the FMD 200 can switch the finder mode and the reproduction mode.

In FIG. 10, the control unit 201 first judges whether the power supply of the FMD 200 is ON (step S301). When the power supply is determined to be OFF in the judgment at the step S301, the control unit 201 terminates processing depicted in FIG. 10. In this case, the FMD 200 does not display images. On the other hand, when the power supply is determined to be ON in the judgment at the step S301, the control unit 201 controls the shutter driving unit 205 to open the shutter 303 (step S302). In such a transparent glass mode, the user can obtain a transparent glass view.

Then, the control unit 201 judges whether an image has been received from the camera 100 via the communication unit 202 (step S303). When it is determined that the image has been received from the camera 100 in the judgment at the step S303, the control unit 201 controls the shutter driving unit 205, thereby causing the shutter 303 to enter the light shielding state (step S304) Subsequently, the control unit 201 controls the display driving unit 204 to display the image received through the communication unit 202 in the display unit 301 (step S305).

Then, the control unit 201 judges whether the operation mode of the FMD 200 is the finder mode (step S306). When the operation mode of the FMD 200 is determined to be the finder mode in the judgment at the step S306, the processing returns to the step S303. Additionally, the control unit 201 waits for the next image to be transmitted from the camera 100. In the finder mode, since images are sequentially transmitted from the camera 100, the same through-image display as that in the camera 100 can be performed in the FMD 200 by displaying these images in the display unit 301, Further, when it is determined that the operation mode of the FMD 200 is not the finder mode in the judgment at the step S306, i.e., that the operation mode is the reproduction mode, the control unit 201 records an image file received through the communication unit 202 in the recording unit 203 (step S307). Then, the processing returns to the step S301.

Furthermore, when it is determined that the image has not been received from the camera 100 in the judgment at the step S303, the control unit 201 transmits a power supply ON instruction to the camera 100 via the communication unit 202 (step S308). When this instruction is received, the power supply of the camera 100 is turned on. Then, the control unit 201 judges whether the operation mode of the FMD 200 is the reproduction mode (step S309). When it is determined that the operation mode of the FMD 200 is not the reproduction mode in the judgment at the step S309, the processing returns to the step S301. On the other hand, when the operation mode of the FMD 200 is determined to be the reproduction mode in the judgment at the step S309, the control unit 201 controls the shutter driving unit 205, thereby causing the shutter 303 to enter the light shielding state (step S310). Thereafter, the control unit 201 expands an image in the latest recorded image file in image files recorded in the recording unit 203 and then displays the image in the display unit 301 (step S311). After reproduction of the image, the control unit 201 judges whether the reproduction image is to be switched, i.e., whether the user has manipulated the operation unit 207 to effect an operation for switching the reproduction image (step S312). When it is determined that the reproduction image is not to be switched in the judgment at the step S312, the processing advances to step S314. On the other hand, when the reproduction image is determined to be switched in the judgment at the step S312, the control unit 201 sets an image file having the next latest recording date and hour in images files recorded in the recording unit 203 as the next candidate image to be displayed in the display unit 301 (step S313).

After the step S312 or the step S313, the control unit 201 judges whether the processing in the reproduction mode is to be terminated, i.e., whether the user has performed an operation for terminating the reproduction mode (the step S314). When it is determined that the operation for terminating the reproduction mode has been performed in the judgment at the step S314, the processing returns to the step S301. On the other hand, when it is determined that the operation for terminating the reproduction mode has not been performed in the judgment at the step S314, the processing returns to the Step S312. In this case, the control unit 201 continues reproduction of the candidate image.

As explained above, according to this embodiment, since no image is transmitted to the FMD 200 while the camera 100 is vibrating, the possibility that discomfort feeling is given to the user wearing the FMD 200 can be reduced. Further, even if the vibration occurs, the user can always confirm an image in the FMD 200 at a necessary timing in shooting by transmitting the image to the FMD 200 while the release button is being pressed halfway.

Figure 11:
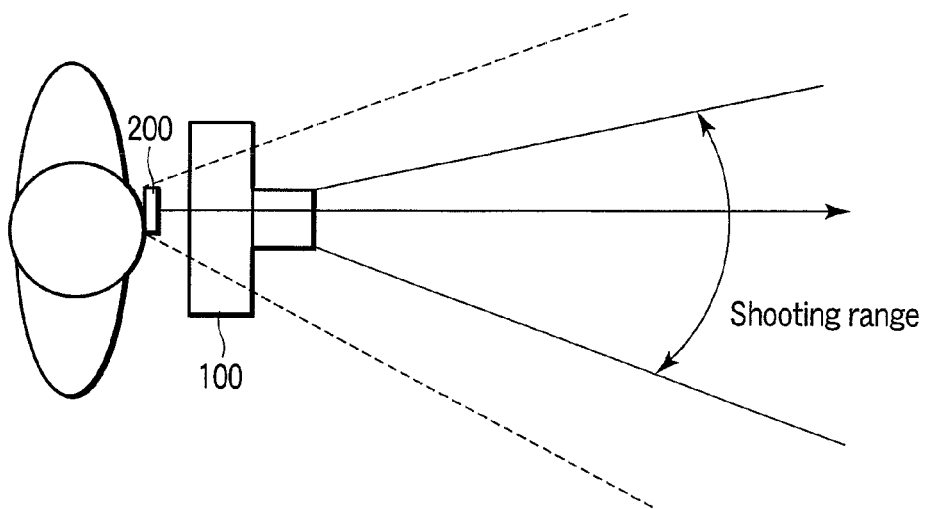
FIGS. 11A, 11B and 11C are views for explaining a difference between the vibration of the camera and recomposition.
Figure 11:
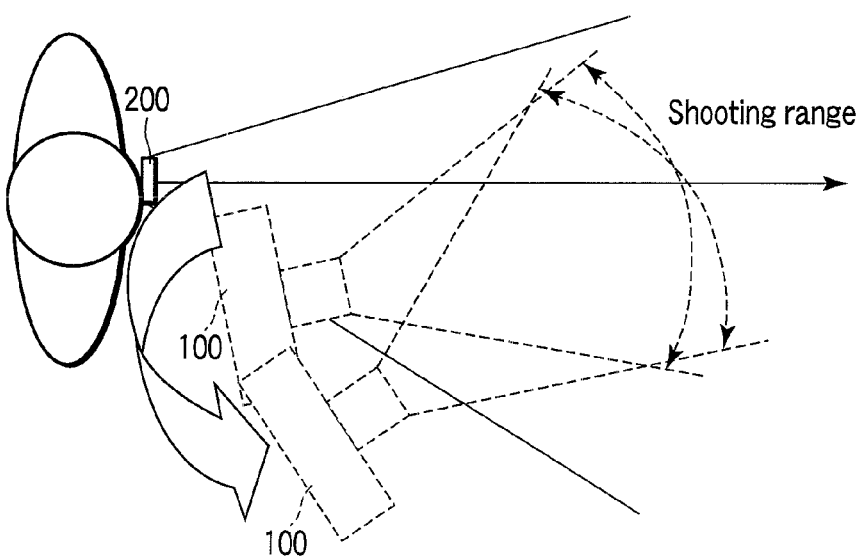
Figure 11:
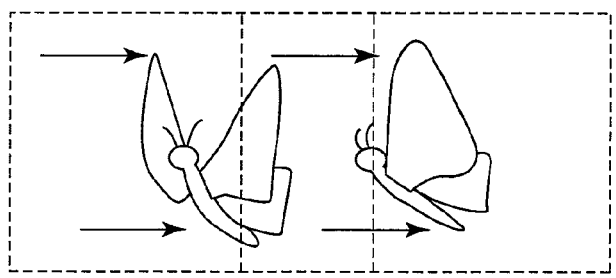

Here, the movement caused by changing a direction of the camera 100 as shown in FIG. 11B from a state that the camera 100 is held as depicted in FIG. 11A is different from the vibration of the camera 100 such as camera shake. Therefore, keeping displaying an image of the camera 100 in the FMD 200 is desirable. In this embodiment, the vibration of the camera 100 is detected by using motion vector. In case of change of composition from FIG. 11A to FIG. 11B, directions of changes in motion vectors are a fixed direction as depicted in FIG. 11C. Therefore, the change of composition and the camera shake can be separately detected. As a result, the user can concentrate on moving the camera 100 alone to determine a composition without moving around even in a situation that he/she shoots a small subject while changing a position. It is considered that an effect of utilizing the FMD 200 as a finder apparatus is high even in such a situation.

Figure 12:
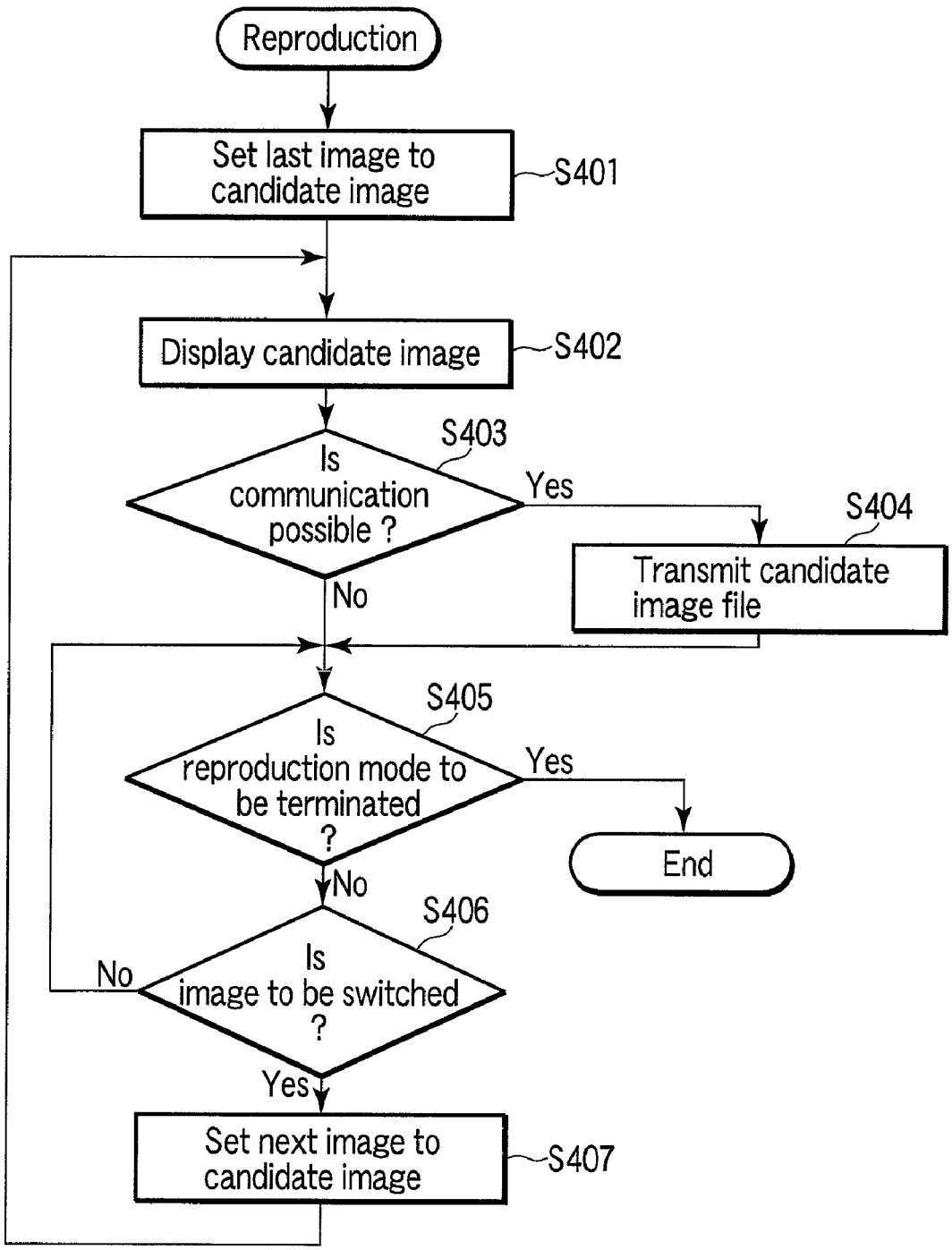
FIG. 12 is a flowchart showing a modification of processing in the reproduction mode.

A modification of this embodiment will now be described. First, a candidate image may be displayed in the FMD 200 by such processing as depicted in FIG. 12 when reproducing an image by the camera 100. That is, although displaying an image in real time is requested at the time of shooting, since real-time properties are not demanded at the time of reproduction, a compressed image recorded in the recording unit 107 is transmitted in place of a candidate image which is in a reproduction process. As a result, an image transmission time can be reduced to achieve energy saving.

A flowchart in FIG. 12 is a substitute for the flowchart in FIG. 9. In FIG. 12, the control unit 101 sets the latest recorded image file in image files recorded in the recording unit 107 as a reproduction candidate image (step S401). Then, the control unit 101 expands an image in the image file set as the candidate image and then displays it in the display unit 105 (step S402). Subsequently, the control unit 101 judges whether communication with the FMD 200 is possible (step S403).

When it is determined that communication with the FMD 200 is possible in the judgment at the step S403, the control unit 101 transmits the image file corresponding to the image set as the candidate image to the FMD 200 through the communication unit 108 to reproduce the image in the FMD 200 (step S404).

Further, when it is determined that the communication with the FMD 200 is impossible in the judgment at the step S403, the control unit 101 judges whether the processing in the reproduction mode is to be terminated, i.e., whether the user has performed an operation for terminating the reproduction mode (step S405). When it is determined that the operation for terminating the reproduction mode has been carried out in the judgment at the step S405, the control unit 101 terminates the processing in FIG. 12. On the other hand, when it is determined that the operation for terminating the reproduction mode has not been performed in the judgment at the step S405, the control unit 101 judges whether the reproduction image is to be switched, i.e., whether the user has manipulated the operation unit 102 to perform an operation for switching the reproduction image (step S406). When it is determined that the reproduction image is not be switched in the judgment at the step S406, the processing returns to the step S405. In this case, the control unit 101 again judges whether the processing in the reproduction mode is to be terminated. On the other hand, when it is determined that the reproduction image is to be switched in the judgment at the step S406, the control unit 101 sets an image file having the next latest shooting date and hour in image files recorded in the recording unit 107 as the next candidate image (step S407). Then, the processing returns to the step S401, and the control unit 101 reproduces the image file set as the new candidate image.

In such a modification as depicted in FIG. 12, an image file can be transmitted to the FMD 200 even during display of an image in the display unit 105 of the camera 100.

Figure 13:
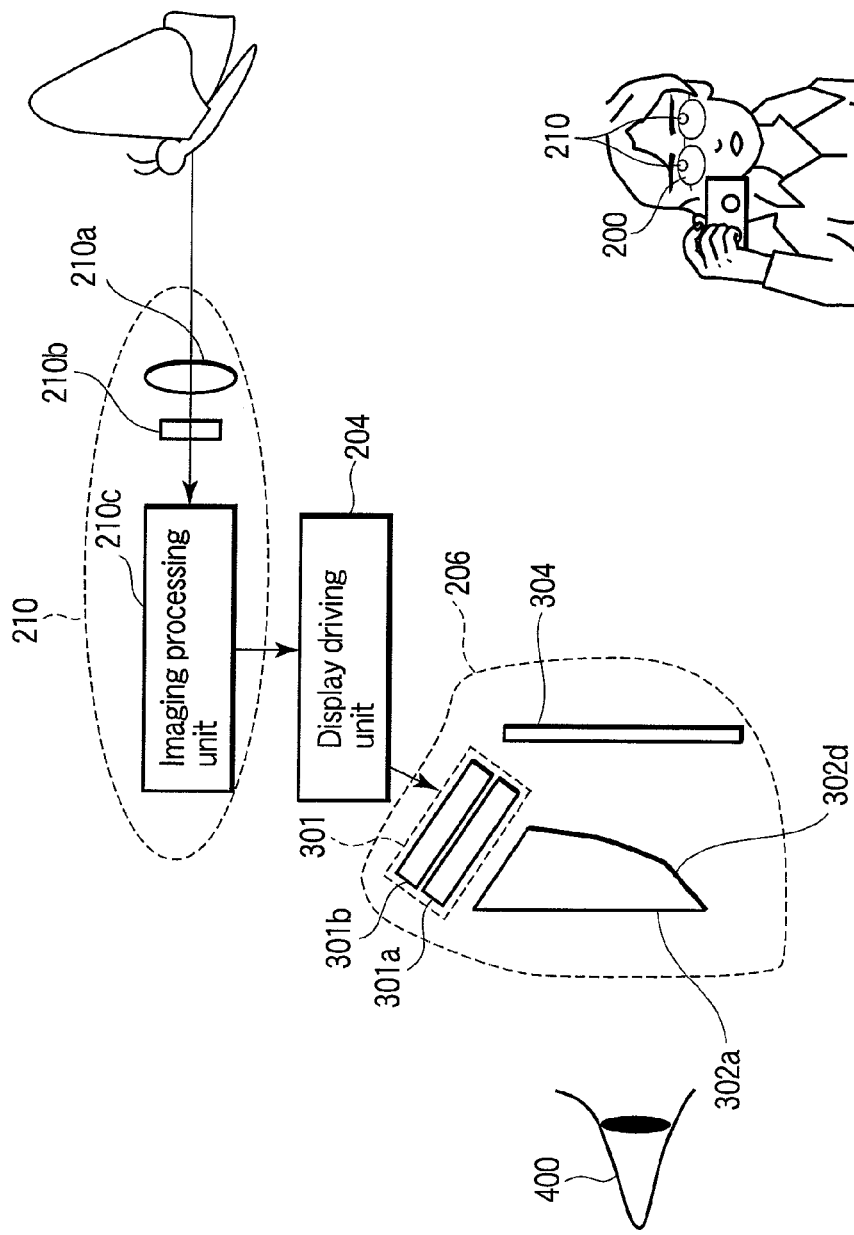
FIG. 13 is a view showing a modification of a configuration of the optical system.

Further, the optical system 206 depicted in FIG. 2 is taken as an example of an optical system in which the shutter 303 is opened to obtain a transparent glass view when the user is not holding the camera 100. However, the configuration of the optical system 206 is not restricted to that shown in FIG. 2A. For example, such an auxiliary camera 210 as shown in FIG. 13 may be provided to the FMD 200. This auxiliary camera 210 has a shooting lens 210a, an imaging unit 210b and an imaging processing unit 210c. The shooting lens 210a has the same function as the shooting lens 103, and it is a lens that causes a light flux from a subject outside the FMD 200 to enter the imaging unit 210b. The imaging unit 210b having a function as an auxiliary imaging unit has the same function as the imaging unit 104, and it acquires an image by converting an image of the subject based on the light flux from the shooting lens 210a into an electrical signal. Furthermore, the imaging unit 210b outputs an image to the imaging processing unit 210c as digital data. The imaging processing unit 210c performs image processing with respect to the image acquired through the imaging unit 210b to be output to the display driving unit 204.

In such a configuration as depicted in FIG. 13, the same function as that of the optical system shown in FIG. 2A can be realized by just appropriately switching an image which is displayed in the display unit 301. That is, it is good enough to execute control to display an image acquired through the auxiliary camera 210 in the display unit 301 except a situation that an image is received from the camera 100 or an image recorded in the recording unit 203 is reproduced.

Here, in the configuration depicted in FIG. 13, the freeform surface prism 302a does not have to coated with the half mirror 302b, and simply coating the same with a reflecting mirror 302d can suffice. Moreover, the correction prism 302c is not required either. Additionally, the shutter 303 is not required either, and light shielding can be effected by using a mask 304 in place of the shutter 303. That is, adopting the configuration shown in FIG. 13 enables simplifying the configuration of the optical system 206 as compared with the configuration depicted in FIG. 2.

Figure 14B:
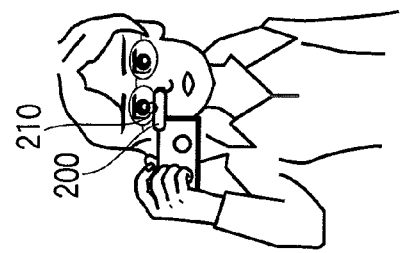
FIGS. 14A and 14B are views each showing an example of the appearance of the optical system according to the modification.
Figure 14A:
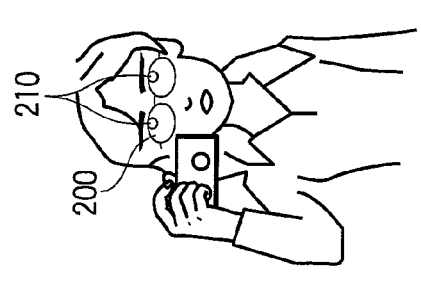

The FMD 200 shown in FIG. 13 may be such an FMD for both eyes or such a spectacle wearable FMD 200 which does not completely block a viewing field as depicted in FIG. 14.

Second Embodiment

A second embodiment according to the present invention will now be described. FIG. 15 is a block diagram showing a configuration of a camera system having a camera according to a second embodiment of the present invention. Portions different from those in FIG. 1 alone will be described hereinafter with reference to FIG. 15.

A control unit 101 in the second embodiment also has a function as an image combination unit besides the functions explained in the first embodiment. This control unit 101 combines images acquired through an imaging unit 104 to generate a combined image as required when displaying an image in an FMD 200.

When a user performs an operation for moving a camera 100, a moving direction detection unit 119 detects its moving direction. This moving direction detection unit 119 detects a moving direction of the camera 100 based on motion vector calculated from an image acquired through the imaging unit 104, for example. The motion vector can be obtained by calculating a shift (a shift direction and a shift length) of a subject between images acquired by a continuous operation via the imaging unit 104 based on, e.g., a block matching method. The moving direction of the camera 100 may be detected by using a dedicated sensor.

An auxiliary imaging unit 217 acquires an image of a subject outside the FMD 200 and outputs the image obtained by imaging to a display driving unit 204 as digital data.

FIG. 16 is a view showing an example of configurations of an optical system 206 and the auxiliary imaging unit 217 in the second embodiment.

As shown in FIG. 16, the optical system 206 has a display unit 311, an optical unit 312 and a light shielding mask 313.

The display unit 311 is a display unit that displays an image received by a communication unit 202 or an image recorded in a recording unit 203. It has the same configuration as that of the display unit 301 depicted in FIG. 2A.

The optical unit 312 has a free-form surface prism 312a whose curved surface is formed to reflect light from the display unit 311 toward an eye 400 of a user. A free-form surface portion of this free-form surface prism 312a is coated with a reflecting mirror 312b.

The light shielding mask 313 is arranged in front of the free-form surface prism 312a to prevent light from entering the free-form surface prism 312a from the outside of the FMD 200.

Additionally, as shown in FIG. 16, the auxiliary imaging unit 217 has a shooting lens 217a, an imaging unit 217b and an imaging processing unit 217c.

The shooting lens 217a has the same function as that of the shooting lens 103, and it is a lens which causes a light flux from a subject provided outside the FMD 200 to enter the imaging unit 217b. The imaging unit 217b has the same function as that of the imaging unit 104, and it converts an image of the subject based on light flux from the shooting lens 217a into an electrical signal to acquire an image. Further, the imaging unit 217b outputs an image to the imaging processing unit 217c as digital data. The imaging processing unit 217c performs image processing with respect to the image acquired to through the imaging unit 217b to be output to a display driving unit 204.

In such a configuration, when an image is displayed in the display unit 311 (when a backlight 311b is ON), light based on the image displayed in the display unit 311 strikes on the eye 400 of the user through such a light path as indicated by arrows in FIG. 16. As a result, the user can see the image displayed in the display unit 311. At this time, when the image displayed in the display unit 311 is an image from the auxiliary imaging unit 217, the user can confirm an image outside the FMD 200 which is present in a direction that a line of sight of the user faces. On the other hand, when the image displayed in the display unit 311 is an image transmitted from the camera 100, the user can confirm an image that is present in a direction that the camera 100 faces at this moment.

Each of FIGS. 17A and 17B is an appearance diagram of the FMD 200. The FMD 200 in this embodiment has such a substantially monocle-like appearance for one eye as shown in FIG. 17A, and the user puts an arc portion 200a formed in the FMD 200 like glasses on an ear and presses a nose pad portion 200b against a nose to wear the FMD 200.

Here, FIG. 17A shows an example where a communication conformation of the FMD 200 is wireless communication. In this case, an antenna 202a of the communication unit 202 is provided to the FMD 200. On the other hand, when the communication conformation of the FMD 200 is wire communication, a cable 202b is connected with the FMD 200. Although each of FIGS. 17A and 17B shows the FMD 200 that can be put with respect to one eye alone, the FMD 200 may be configured to be put with respect to both eyes. In such a case, the pair of optical systems 206 depicted in FIG. 16 must be provided.

Figure 18A:
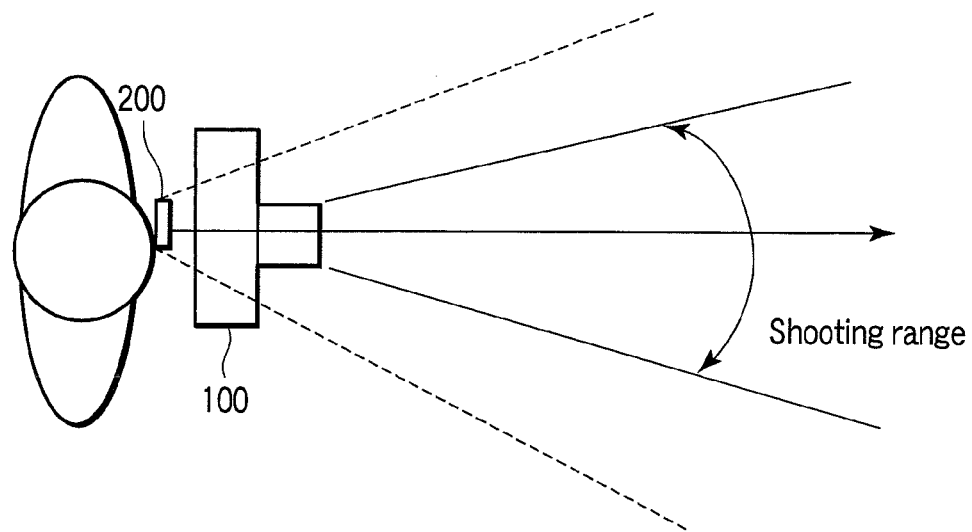
FIG. 18A is a view showing an example when a direction that a user faces coincides with a direction of the camera.
Figure 18B:
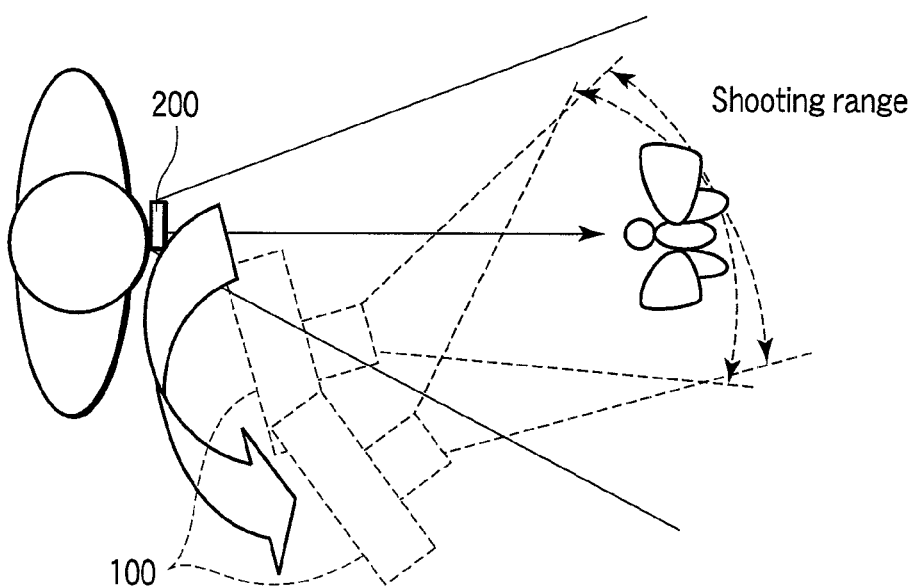
FIG. 18B is a view showing an example when the direction that the user faces is different from the direction of the camera.

Here, when the user holds the camera 100 as shown in FIG. 18A, a direction that the user is to see coincides with a shooting range of the camera 100. Therefore, in this case, an image of a subject that is present in the direction that the user sees is displayed in the display unit 311 of the FMD 200. On the other hand, when the user moves the camera 100 alone as depicted in FIG. 18B, an image that is seen from a direction different from the direction that the user sees is displayed. When such an image is displayed, the user may be possibly confused. In particular, when the FMD 200 is of a type which is put with respect to both eyes, the user can recognize a situation of the outside from an image in the display unit 311 alone, and hence a possibility that the user confuses further increases.

Therefore, in this embodiment, if the camera 100 moves when the FMD 200 is used as a finder, an image representing how the camera moves is displayed in the display unit 311 of the FMD 200. As a result, the user can recognize a direction that the camera 100 faces.

A detailed operation of the camera system according to this embodiment will now be described.

An operation of the camera 100 will be first explained. FIG. 19 is a flowchart showing a main operation of the camera 100. Here, the camera 100 in this embodiment has a shooting mode and a reproduction mode as operation modes.

In FIG. 19, the control unit 101 of the camera 100 first judges whether a power supply of the camera 100 has been turned on (step S501). When it is determined that the power supply is OFF in the judgment at the step S501, the control unit 101 terminates processing in FIG. 19. When the communication unit 108 operates even in the OFF state of the power supply and the FMD 200 issues an instruction for turning on the power supply via the communication unit 108, the control unit 101 turns on the power supply of the camera 100.

On the other hand, when it is determined that the power supply has been turned on in the judgment at the step S501, the control unit 101 judges whether the operation mode of the camera 100 is the shooting mode (step S502). When it is determined that the operation mode of the camera 100 is the shooting mode in the judgment at the step S502, the control unit 101 carries out exposure correction (step S503).

Then, the control unit 101 judges whether communication with the FMD 200 is possible from a communication state of the communication unit 108 (step S504). When it is determined that the communication with the FMD 200 is possible in the judgment at the step S504, the control unit 101 judges whether a photographer has pressed a release button in an operation unit 102 halfway (step S505). When it is determined that the release button has been pressed halfway in the judgment at the step S505, the control unit 101 operates an imaging unit 504 to record an image acquired through the imaging unit 104 in the recording unit 107 (step S506). Thereafter, the control unit 101 judges whether the camera 100 has moved from an output from the moving direction detection unit 119 (step S507). When detecting a moving direction from motion vectors, at least two images are required. Therefore, it is determined in the first time that the camera 100 has no movement in the judgment at the step S507.

When the movement of the camera 100 is detected in the judgment at the step S507, the control unit 101 detects a moving direction of the camera 100 from an output from the moving direction detection unit 119 (step S508). Then, the control unit 101 combines images recorded in the recording unit 107 at the step S505 to generate a combined image and transmits this combined image to the FMD 200 via the communication unit 108 (step S509). The combination of images will be described later.

Moreover, when it is determined that the release button has been pressed halfway in the judgment at the step S505, or when the camera 100 has no movement in the judgment at the step S507, the control unit 101 carries out regular through-image display in the display unit 311 of the FMD 200. Therefore, the control unit 101 transmits an image acquired by the imaging unit 104 to the FMD 200 through the communication unit 108 (step S510).

Additionally, when the communication with the FMD 200 is determined to be impossible in the judgment at the step S504, the control unit 101 carries out through-image display in the display unit 105 (step S511). In the through-image display on the camera side 100, the control unit 101 allows the imaging unit 104 to continuously operate and displays images sequentially obtained via the imaging unit 104 by this continuous operation to the display unit 105 in real time.

After the through-image display or the combined image display, the control unit 101 judges whether the photographer has fully pressed the release button in the operation unit 102 (step S512). When it is determined that the release button has not been fully pressed in the judgment at the step S512, the processing returns to the step S501. In this case, the control unit 101 again judges whether the power supply of the camera 100 is ON. On the other hand, when it is determined that the release button has been pressed in the judgment at the step S512, the control unit 101 executes exposure control (step S513). After fetching an image, the control unit 101 carries out image processing such as compression processing with respect to the fetched image and then adds shooting conditions such as a shooting date and hour measured by a clock unit 106 with respect to the processed image, thereby generating an image file. Further, the control unit 101 records the generated image file in the recording unit 107 (step S514). Then, the processing returns to the step S501.

Furthermore, when it is determined that the operation mode of the camera 100 is not the shooting mode in the judgment at the step S502, the control unit 101 judges whether the operation mode of the camera 100 is the reproduction mode (step S515). When it is determined that the operation mode of the camera 100 is not the reproduction mode in the judgment at the step S515, the processing returns to the step S501. On the other hand, when the operation mode of the camera 100 is determined to be the reproduction mode in the judgment at the step S515, the control unit 101 performs the processing in the reproduction mode (step S516). After the processing in the reproduction mode, the processing returns to the step S501. The processing in the reproduction mode is the same as that depicted in FIG. 9.

FIG. 20 is a flowchart showing a main operation of the FMD 200. Here, the FMD 200 in this embodiment has a finder mode, a reproduction mode and an external display mode as operation modes. The finder mode and the reproduction mode are the same as those in the first embodiment. Further, the external display mode is an operation mode that enables confirming a situation outside the FMD 200 by displaying an image from the auxiliary imaging unit 217 in the display unit 311.

In FIG. 20, a control unit 201 first judges whether a power supply of the FMD 200 is ON (step S601). When the power supply is determined to be OFF in the judgment at the step S601, the control unit 201 terminates processing in FIG. 20. In this case, the FMD 200 does not display an image. On the other hand, when the power supply is determined to be ON in the judgment at the step S601, the control unit 201 controls the auxiliary imaging unit 217. Furthermore, the control unit 201 displays an image acquired by the auxiliary imaging unit 217 in the display unit 311 (step S602). As a result, the user can observe a situation outside the FMD 200.

Then, the control unit 201 judges whether an image has been received from the camera 100 via the communication unit 202 (step S603). When it is determined that an image has been received from the camera 100 in the judgment at the step S603, the control unit 201 stops display of an image from the auxiliary imaging unit 217 (step S604). Subsequently, the control unit 201 controls the display driving unit 204 to display the image received via the communication unit 202 in the display unit 311 (step S605).

Then, the control unit 201 judges whether the operation mode of the FMD 200 is a finder mode (step S606). When the operation mode of the FMD 200 is determined to be the finder mode in the judgment at the step S606, the processing returns to the step S603. Further, the control unit 201 waits for the next image to be transmitted from the camera 100.

Furthermore, when the operation mode of the FMD 200 is not the finder mode, i.e., it is determined to be the reproduction mode in the judgment at the step S606, the control unit 201 records the image file received via the communication unit 202 in the recording unit 203 (step S607). Thereafter, the processing returns to the step S601.

Moreover, when it is determined that the image has not been received from the camera 100 in the judgment at the step S603, the control unit 201 transmits a power supply ON instruction to the camera 100 through the communication unit 202 (step S608). When this instruction is received, the power supply of the camera 100 is likewise turned on. Then, the control unit 201 judges whether the operation mode of the FMD 200 is the reproduction mode (step S609). When it is determined that the operation mode of the FMD 200 is not the reproduction mode in the judgment at the step S609, the processing returns to the step S601. On the other hand, when the operation mode of the FMD 200 is determined to be the reproduction mode in the judgment at the step S609, the control unit 201 stops display of an image from the auxiliary imaging unit 217 (step S610). Then, the control unit 201 expands an image in the latest recorded image file in image files recorded in the recording unit 203, and then displays it in the display unit 311 (step S611). After reproduction of the image, the control unit 201 judges whether the reproduction image is to be switched, i.e., whether the user has manipulated the operation unit 207 to effect an operation for switching the reproduction image (step S612). When it is determined that the reproduction image is not to be switched in the judgment at the step S612, the processing advances to step S614. On the other hand, when it is determined that the reproduction image is to be switched in the judgment at the step S612, the control unit 201 sets an image file having the next latest recording date and hour in image files recorded in the recording unit 203 as the next candidate image and displays it in the display unit 311 (step S613).

After the step S612 or the step S613, the control unit 201 judges whether the processing in the reproduction mode is to be terminated, i.e., whether the user has performed an operation for terminating the reproduction mode (step S614). When it is determined that the operation for terminating the reproduction mode has been performed in the judgment at the step S614, the processing returns to the step S601. On the other hand, when it is determined that the operation for terminating the reproduction mode has not been performed in the judgment at the step S614, the processing returns to the step S612. In this case, the control unit 201 continues reproduction of a candidate image.

The combination of images at the step S509 will now be described. As explained in FIG. 19, when the camera 100 does not move, an image acquired through the imaging unit 104 of the camera 100 is transmitted to the FMD 200, and the image transmitted from the camera 100 is displayed in the display unit 311 of the FMD 200 as shown in FIG. 21A.

Furthermore, in this embodiment, when the camera moves while the release button is pressed halfway, all images recorded at the step S106 during a period that the release button is pressed are combined to be displayed in the display unit 311 of the FMD 200. Images to be combined are images obtained during the period that the release button is pressed halfway because it can be considered that the user has an intention to perform framing during the period that the release button is pressed halfway. Targets of the combination of images does not have to be restricted to images acquired during the period that the release button is pressed halfway.

Here, the combination is carried out by arranging a plurality of images in a shooting order, for example. Furthermore, an index which is an image indicative of a moving direction of the camera 100 is combined near the combined image. Each of FIGS. 21B and 21C shows an example of combination display.

FIG. 21B shows an example of combination display when the camera 100 has moved in the right-hand direction at the next shooting time point in FIG. 21A which is an initial time point. In this case, as shown in FIG. 21B, the combination is carried out in such a manner that a subsequent image 502 is arranged next to (the left side in FIG. 21B) of an image 501 obtained at the initial time point. In this combination, it is desirable to perform the combination while increasing a size of the image 502 as the latest image beyond a size of the image 501. As a result, the user can immediately recognize the latest image (i.e., an image acquired by the camera 100 at a current time point). Moreover, in the combination display, an index 502a is combined near (an upper side of the image 502 in the example shown in FIG. 21B) of the image 502 in such a manner that the moving direction of the camera 100 in a period from acquisition of the image 501 to acquisition of the image 502 can be recognized.

FIG. 21C shows an example of combination example when the camera 100 has further moved in the right-hand direction at the next shooting time point in FIG. 21B. In this case, the combination is carried out in such a manner that a subsequent image 503 is arranged on the immediate left side of the image 502. At this time, the combination is performed while increasing a size of the latest image 503 beyond the sizes of the images 501 and 502. Additionally, an index 503a is combined near (an upper side of the image 503 in the example depicted in FIG. 21C) of the image 503 in such a manner that the moving direction of the camera 100 during a period from acquisition of the image 502 to acquisition of the image 503 can be recognized.

This procedure is likewise applied to combinations of fourth and subsequent images. That is, the latest image is combined with a size larger than those of other images on the immediate left side of a preceding image, and an index representing a moving direction can be combined near the latest image.

When such images as depicted in FIGS. 21B and 21C are displayed in the display unit 311 of the FMD 200, the user can recognize a moving direction of the camera 100 and transition of images involved by this movement. As a result, framing can be facilitated.

Here, each of FIGS. 21A to 21C shows the example where the latest images are sequentially combined toward the left-hand direction. However, the combining direction is not restricted in particular as long as images are arranged in a chronological order. Further, an index combining position is not restricted in particular as long as it is a position at which the correspondence with each image can be grasped.

Furthermore, in the example of FIGS. 21A to 21C, all images obtained during the period that the release button is pressed halfway are combined. On the other hand, for example, the first image obtained after the release button is pressed halfway and the latest image alone may be combined. Each of FIGS. 22A and 22B shows a display example of a combined image in such a case.

Figure 22A:
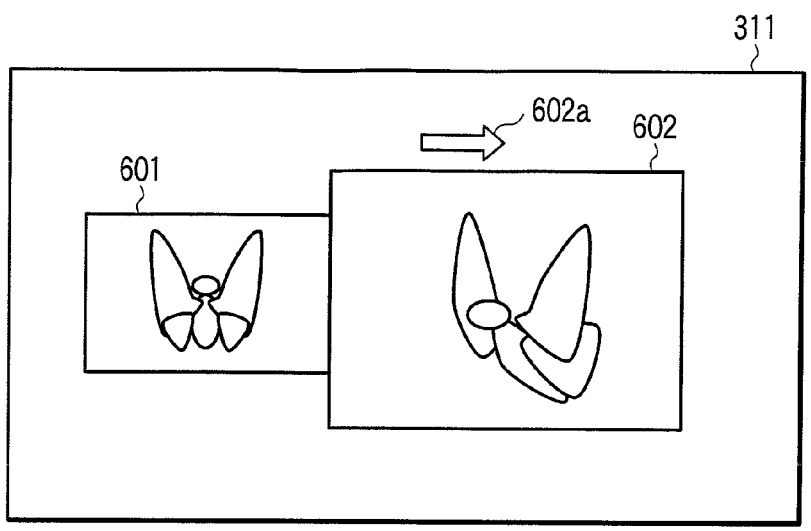
FIGS. 22A and 22B are views each showing a first modification of the combination display.

FIG. 22A shows an example of combination display when the camera 100 has already moved in the left-hand direction at the next imaging time point in FIG. 21A as an initial time point. In this case, as shown in FIG. 22A, the combination is carried out in such a manner that a subsequent image 602 is arranged next to an image 601 (on the right-hand side in FIG. 22A) obtained at the initial time point. In this combination, like the example depicted in FIGS. 21A to 21C, it is desirable to perform the combination while increasing a size of an image 602 as the latest image beyond a size of the image 601. Moreover, at the time of the combination display, an index 602a is combined near the image 602 (an upper side of the image 602 in the example depicted in FIG. 22A) so that a moving direction of the camera 100 during a period from acquisition of the image 601 to acquisition of the image 602 can be grasped.

Figure 22B:
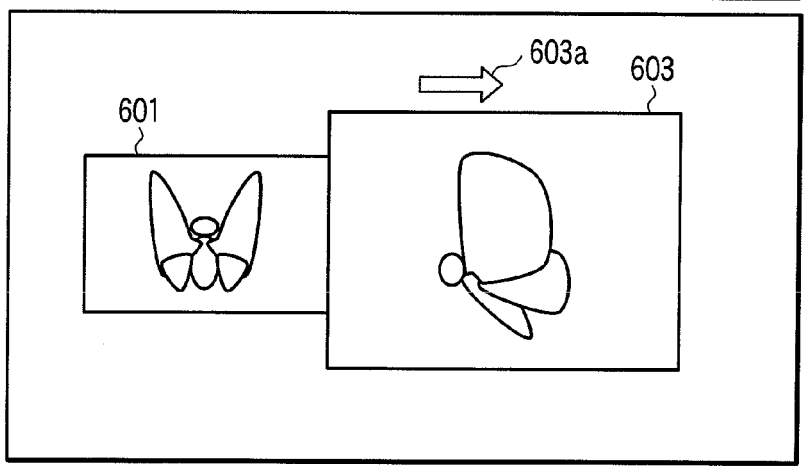

FIG. 22B shows an example of the combination display when the camera 100 has further moved in the right-hand direction at the next imaging time point in FIG. 22A. In this case, as shown in FIG. 22B, the combination is carried out in such a manner that an image 603 following the image 602 is arranged on the immediate right side of the image 601. At this moment, the combination is effected while increasing a size of the latest image 603 beyond the size of the image 601. Additionally, an index 603a is combined near the image 603 so that a moving direction of the camera 100 during a period from acquisition of the image 602 to acquisition of the image 603 can be grasped. As this moving direction, the moving direction with respect to the first image 601 may be displayed.

Figure 23:
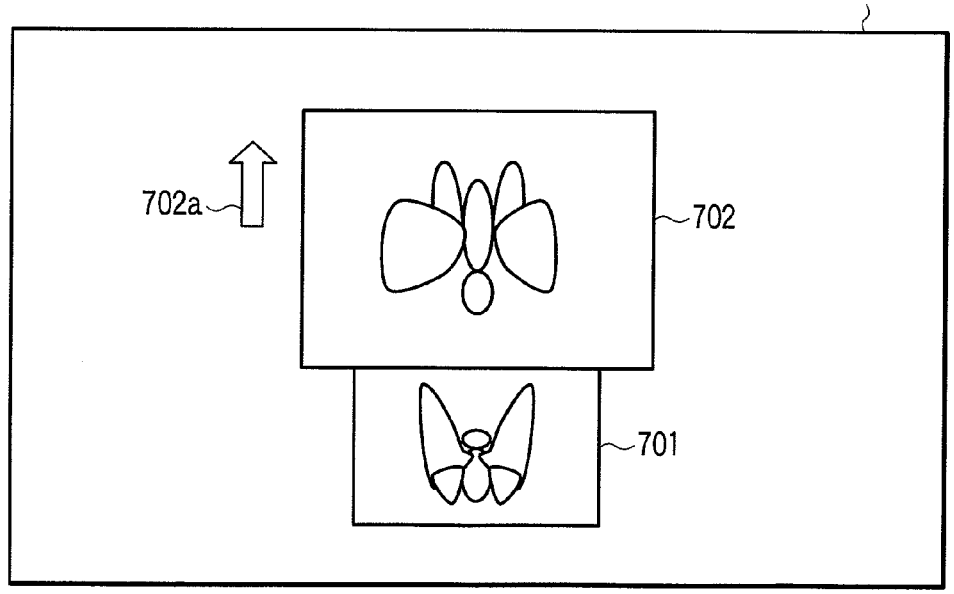
FIG. 23 is a view showing a second modification of the composite display.

Further, in the example depicted in FIGS. 22A and 22B, a combining position of the latest image may be determined in accordance with the moving direction of the camera 100. For example, when the camera 100 has moved in the right-hand direction after acquisition of the first image, the latest image is combined on the immediate right side of the image 601 as shown in FIG. 22A or 22B. Furthermore, for example, when the camera 100 has moved up after acquisition of the first image, the latest image 702 is combined above a first image 701 as shown in FIG. 23. When such combination display is carried out, a user can recognize the moving direction of the camera 100 from the images displayed in the display unit 311 alone. In this case, an index 702a is not combined above the image 702 but combined on the left side of the image 702, for example.

Moreover, although the through-image display and the combined image display are executed as different pieces of processing in the foregoing embodiment, a combined image may be superimposed and displayed in the through-image display while effecting the through-image display.

Additionally, in the foregoing embodiment, images are combined on the camera 100 side. However, an image recorded while the release button is pressed and a moving direction of the camera 100 alone may be transmitted from the camera 100 to the FMD 200 to carry out the combination of images in the FMD 200. Further, the FMD 200 may be able to detect a moving direction of the camera 100. As a detection technique for a moving direction of the camera 100 in this case, a technique of detecting a change in a motion vector of the camera 100 in an image obtained through the auxiliary imaging unit 217 can be considered, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera which operates in cooperation with a wearable image display apparatus configured to be wearable on an eye region of a user, comprising:
   an imaging unit which acquires an image by imaging a subject;
   a vibration detection unit which detects a state of the camera held by the user by detecting vibration of the camera;
   a transmission availability judgment unit which permits transmission of the image acquired by the imaging unit to the wearable image display apparatus when the vibration detection unit does not detect the state of the camera held by the user, and which prohibits transmission of the image acquired by the imaging unit to the wearable image display apparatus when the vibration detection unit detects the state of the camera held by the user; and
   a communication unit which transmits the image acquired by the imaging unit to the wearable image display apparatus when transmission of the image acquired by the imaging unit is permitted.

2. The camera according to claim 1, wherein the vibration detection unit detects the vibration of the camera based on motion vectors calculated from the image acquired by the imaging unit.

3. The camera according to claim 2, wherein the vibration detection unit detects occurrence of the vibration in the camera when the motion vectors in an entire image acquired by the imaging unit are equal to one another and changes in the motion vectors in the entire image are larger than a threshold value.

4. The camera according to claim 1, further comprising a release button that is utilized to instruct preparation for shooting,
   wherein the transmission availability judgment unit permits transmission of the image acquired by the imaging unit to the wearable image display apparatus irrespective of detecting by the vibration detection unit while the release button is operated.

5. A camera which operates in cooperation with a wearable image display apparatus configured to be wearable on an eye region of a user, comprising:
   an imaging unit which acquires an image by imaging a subject;
   a vibration detection unit which detects vibration of the camera; and
   a communication unit which permits transmission of the image acquired by the imaging unit to the wearable image display apparatus when the vibration detection unit does not detect the vibration of the camera, and when the vibration detection unit detects the vibration of the camera, transmits the image acquired by the imaging unit to the wearable image display apparatus at an image transmission rate slower than the image transmission rate at a time when the vibration of the camera is not detected.

6. A camera which operates in cooperation with a wearable image display apparatus configured to be wearable on an eye region of a user, comprising:
   an imaging unit which acquires a plurality of images by continuously imaging a subject;
   a moving direction detection unit which detects moving direction of the camera at the time of acquiring each of the plurality of images;
   an image combination unit which generates a combined image obtained by combining the plurality of images acquired by the imaging unit with images indicative of the moving directions of the camera; and
   a communication unit which transmits the combined image obtained by the image combination unit to the wearable image display apparatus.

7. The camera according to claim 6, further comprising a release button which is utilized to instruct preparation for shooting,
   wherein the moving direction detection unit detects moving directions of the camera while the release button is instructing preparation for shooting, and
   the image combination unit generates the combined image obtained by combining the plurality of images acquired by the imaging unit with the images indicative of the moving directions of the camera while the release button is instructing preparation for shooting.

8. The camera according to claim 7, wherein the image combination unit arranges in an imaging order the plurality of images acquired by the imaging unit while the release button is instructing preparation for shooting, and generates the combined image by combining an index indicative of the moving direction of the camera near each of the plurality of images.

9. The camera according to claim 7, wherein the image combination unit arranges a last image in an imaging order to be adjacent to a first image in the imaging order in the plurality of images acquired by the imaging unit while the release button is instructing preparation for shooting, and generates the combined image by combining an index indicative of the moving direction of the camera near each of the first image in the imaging order and the last image in the imaging order.

10. The camera according to claim 9, wherein the image combination unit generates the combined image in such a manner that the moving direction of the camera is associated with a combining position of the last image in the imaging order.

11. The camera according to claim 6, wherein the image combining unit generates the combined image in such a manner that a size of the last image in the imaging order becomes larger than sizes of other images.

12. The camera according to claim 6, wherein the moving direction detection unit detects the moving direction of the camera based on motion vectors calculated from the image acquired by the imaging unit.

13. The camera according to claim 7, wherein the moving direction detection unit detects the moving direction of the camera based on motion vectors calculated from the image acquired by the imaging unit.

14. The camera according to claim 8, wherein the moving direction detection unit detects the moving direction of the camera based on motion vectors calculated from the image acquired by the imaging unit.

15. The camera according to claim 9, wherein the moving direction detection unit detects the moving direction of the camera based on motion vectors calculated from the image acquired by the imaging unit.

16. The camera according to claim 10, wherein the moving direction detection unit detects the moving direction of the camera based on motion vectors calculated from the image acquired by the imaging unit.

17. The camera according to claim 11, wherein the moving direction detection unit detects the moving direction of the camera based on motion vectors calculated from the image acquired by the imaging unit.

* * * * *